INVENTOR
GERALD J. ERICKSON
BY Herbert [signature]
ATTORNEY

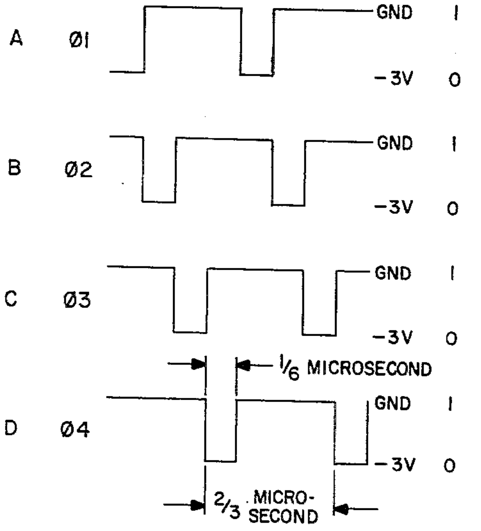
Fig. 2
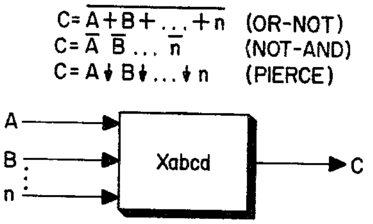
Fig. 4
| A | B | ... | n | C |
|---|---|---|---|---|
| 0 | 0 | | 0 | 1 |
| 0 | 0 | | 1 | 0 |
| 0 | 1 | | 0 | 0 |
| 0 | 1 | | 1 | 0 |
| 1 | 0 | | 0 | 0 |
| 1 | 0 | | 1 | 0 |
| 1 | 1 | | 0 | 0 |
| 1 | 1 | | 1 | 0 |
Fig. 5
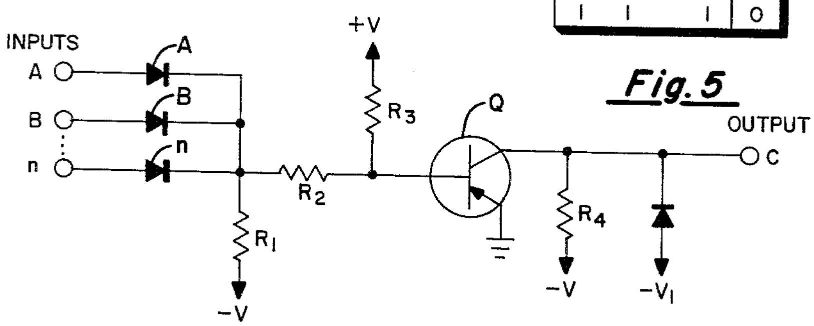
Fig. 3
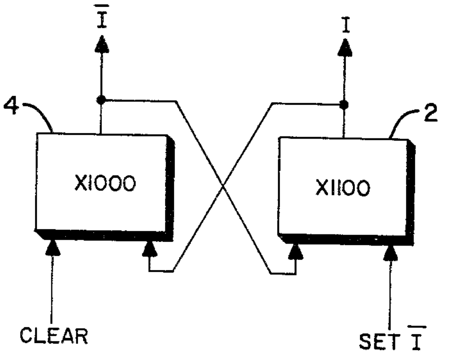
Fig. 6
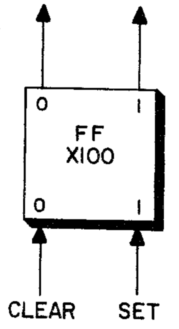
Fig. 7

Feb. 8, 1966 G. J. ERICKSON 3,234,370

SEGMENTED ARITHMETIC DEVICE

Filed March 29, 1962 12 Sheets-Sheet 4

Feb. 8, 1966 G. J. ERICKSON 3,234,370

SEGMENTED ARITHMETIC DEVICE

Filed March 29, 1962 12 Sheets-Sheet 6

Feb. 8, 1966 G. J. ERICKSON 3,234,370

SEGMENTED ARITHMETIC DEVICE

Filed March 29, 1962 12 Sheets-Sheet 8

FROM FIG. 9

Feb. 8, 1966 G. J. ERICKSON 3,234,370

SEGMENTED ARITHMETIC DEVICE

Filed March 29, 1962 12 Sheets-Sheet 9

Feb. 8, 1966 G. J. ERICKSON 3,234,370

SEGMENTED ARITHMETIC DEVICE

Filed March 29, 1962 12 Sheets-Sheet 10

3,234,370
SEGMENTED ARITHMETIC DEVICE
Gerald J. Erickson, Univac Park, St. Paul, Minn.
Filed Mar. 29, 1962, Ser. No. 183,462
12 Claims. (Cl. 235—164)

This invention relates to arithmetic devices employed in high speed digital computers. More particularly it relates to a segmented arithmetic device which can perform its function of either addition or subtraction on a variable number of operands simultaneously.

In digital computers addition or subtraction, per se, is a well known operation usually performed on groups of signals called "machine words." A "machine word" is defined as a grouping of information signals, commonly called bits (binary digits), of a number capable of being stored in one memory section register, and for this embodiment consists of 36 digit positions. The term "operand" refers to any one of the quantities entering into or arising from an operation performed by the device. It may be an argument, a result, a parameter, an instruction, or a memory address. An operand may be a full machine word, or some portion thereof.

Previously to add or subtract independent multiple operands (sometimes referred to as word-segments), such as those representing vector quantities, which are stored in a given memory register, it was necessary to first extract by well-known logical operations (so-called "masking" techniques) the desired digits comprising the operands to be modified. See the term "extract" in IRE Standards on Electronic Computers, Definition of Terms, 1956, 56 IRE 8.51. (This technique of extraction effectively erases the undesired signals from the group of signals transferred to the arithmetic section from a selected memory register, but retains the undesired signals pending further manipulation.) Once the desired digits were extracted and positioned, the arithmetic operation could be performed to either augment or reduce the size of the operand. Finally, it was necessary to combine the modified desired operand with the undesired portion of the signal group which had been retained in a memory register. This procedure was repeated for each word-segment of the memory register signal group desired to be altered arithmetically. Such a technique has the disadvantage of being slow due to the several memory references required, and the fact that several instruction execution periods are necessary to perform each permutation of the respective word-segments.

Assume for purposes of this discussion that a computer having a 36-bit machine word utilizes this invention. This is for purposes of illustration and is not limitive. Then assuming data signal groupings that are capable of being program-selected and expressed wthin an operand-size of 18-, 12-bits, etc.; this invention permits of a more efficient utilization of a computer memory by allowing effectively parallel storage in individual memory registers or multiple-memory register table form of independent operands. One advantage is that the independent operands may be augmented or reduced simultaneously. Further, this arithmetic device requires the execution of only a single program instruction word to augment or reduce the independent multiple operands stored effectively in a given memory register. There is no need for the process of desired operand extraction, arithmetic operation, and recombination process with the unmodified signals that is required in the above mentioned types of machines for permutation of each operand. A result of this invention, then, is to more efficiently utilize the memory registers, and provide a much faster means for operating on multiple independent operands. Since the selective segmentation of the machine word contained in an arithmetic register into various sized digit groupings is under program control for the arithmetic process, a higher degree of efficiency is afforded computers which incorporate this arithmetic device.

It is accordingly an object of this invention to provide an arithmetic device capable of selectively handling multiple independent operands simultaneously.

It is a further object of this invention to provide means for allowing the addition or subtraction of multiple independent operands simultaneously.

Yet another object of this invention is to provide in a single instruction execution period the selective capability to simultaneously augment or reduce multiple independent operands stored effectively in one arithmetic register by multiple independent operands effectively stored in a second arithmetic register.

Yet a further object of this invention is to provide an easier method to more efficiently utilize the computer memory where the data signal groupings are capable of being effectively stored in operand-lengths of a magnitude less than a full machine word, and where such length is capable of being expressed in arbitrary bit-size subdivisions of the machine word.

The objects of this invention may be realized by the means and process described in the following summary. This invention provides a means for selectively augmenting or reducing multiple independent operands contained in a single memory register by multiple operands contained in a second memory register. The invention permits a programmable selection of the operand-length as a subdivision of the machine word. This embodiment utilizes equal-length segments for any selected permutation, but this arbitrary choice is illustrative rather than limitive. Thus, if a 12-bit operand is selected out of a 36-bit machine word for one operand size, the selection is automatically made that the other two operands will be 12-bits in length.

This invention utilizes suitable control circuitry to provide the necessary control signal paths such that when an operand-length is selected, this control circuitry effectively makes this arithmetic device into multiple, independent parallel adders (subtractors). It is this control that permits the simultaneous arithmetic manipulation of the multiple independent operands while they are retained in a single register.

The above and other more detailed and specific objects will be disclosed in the course of the following specification, reference being had to the accompanying drawings, in which:

FIG. 2 illustrates exemplary clocking pulses utilized in this arithmetic device;

FIG. 3 is the electrical schematic of the NOR logic circuit utilized in the preferred embodiment;

FIG. 4 is the block symbol for the basic logical NOR circuit used in the exemplary embodiment of this invention, and is accompanied by the definitive logic equations for this device;

FIG. 5 is the truth table for the NOR block, and illustrates the capability of having a variable number of inputs;

FIG. 6 is a block diagram of an embodiment of a flip-flop which comprises two cross-coupled NOR circuits;

FIG. 7 is the block symbol for a flip-flop;

Figure 8A:
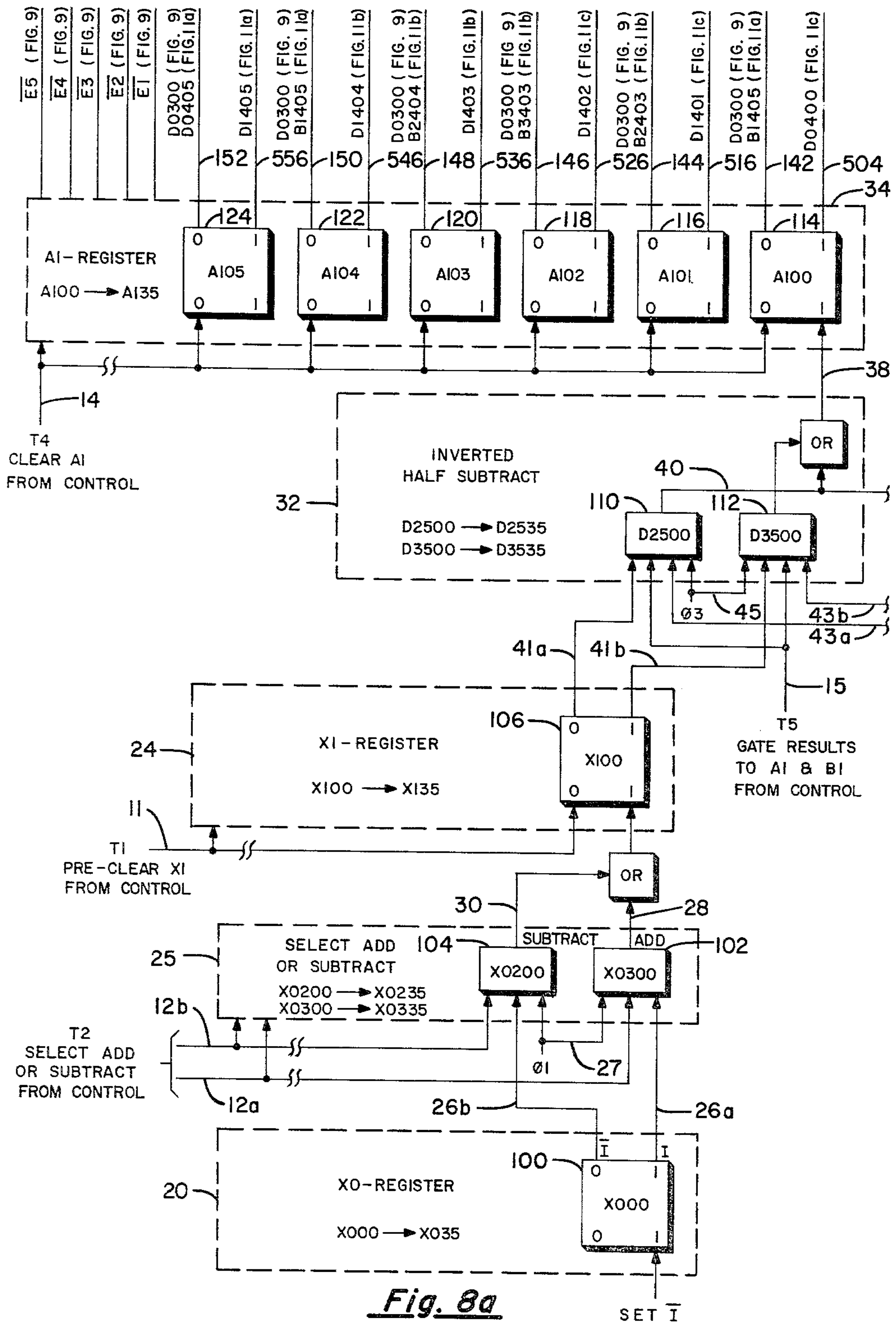
Figure 8B:
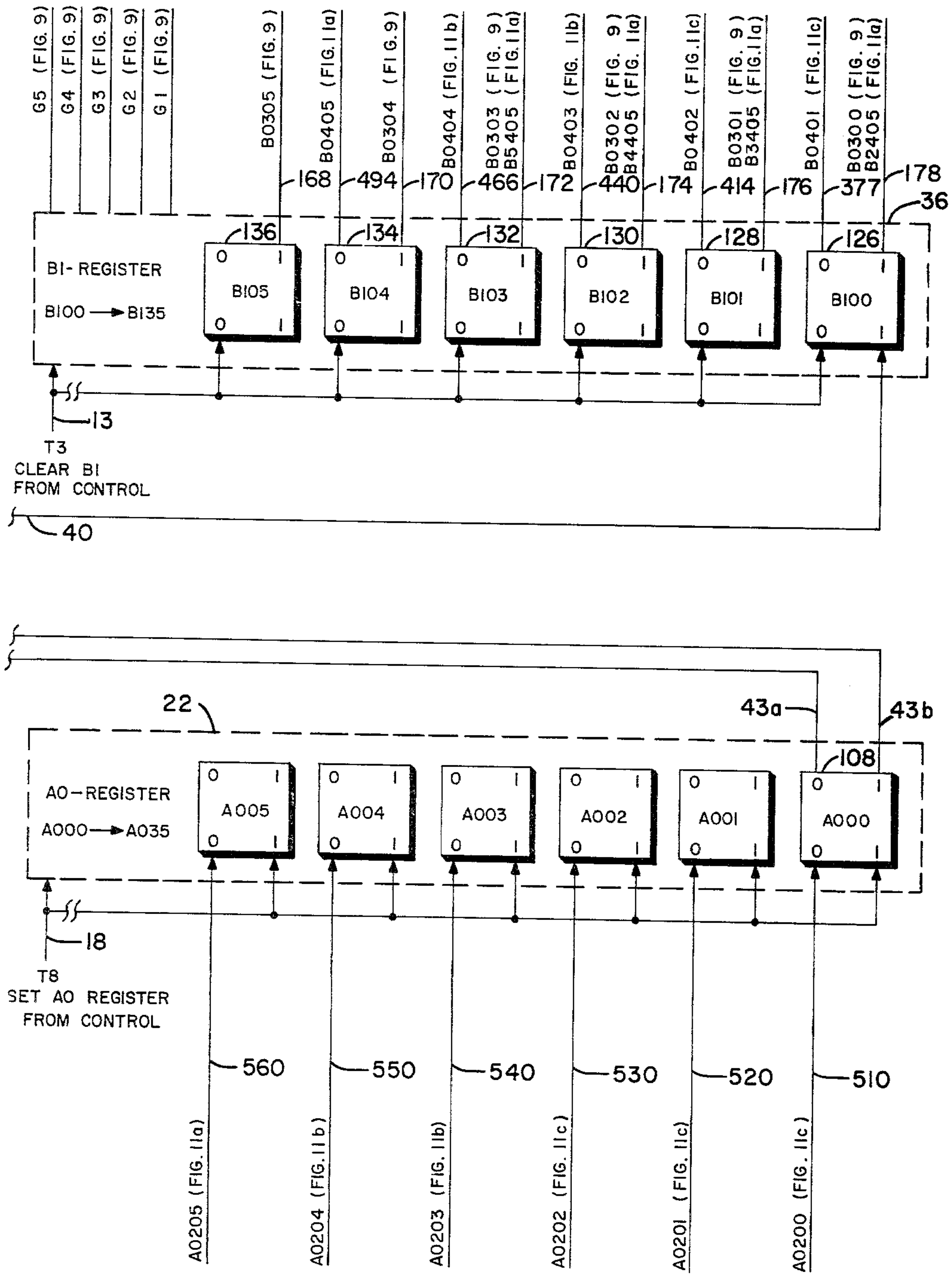
Figure 9:
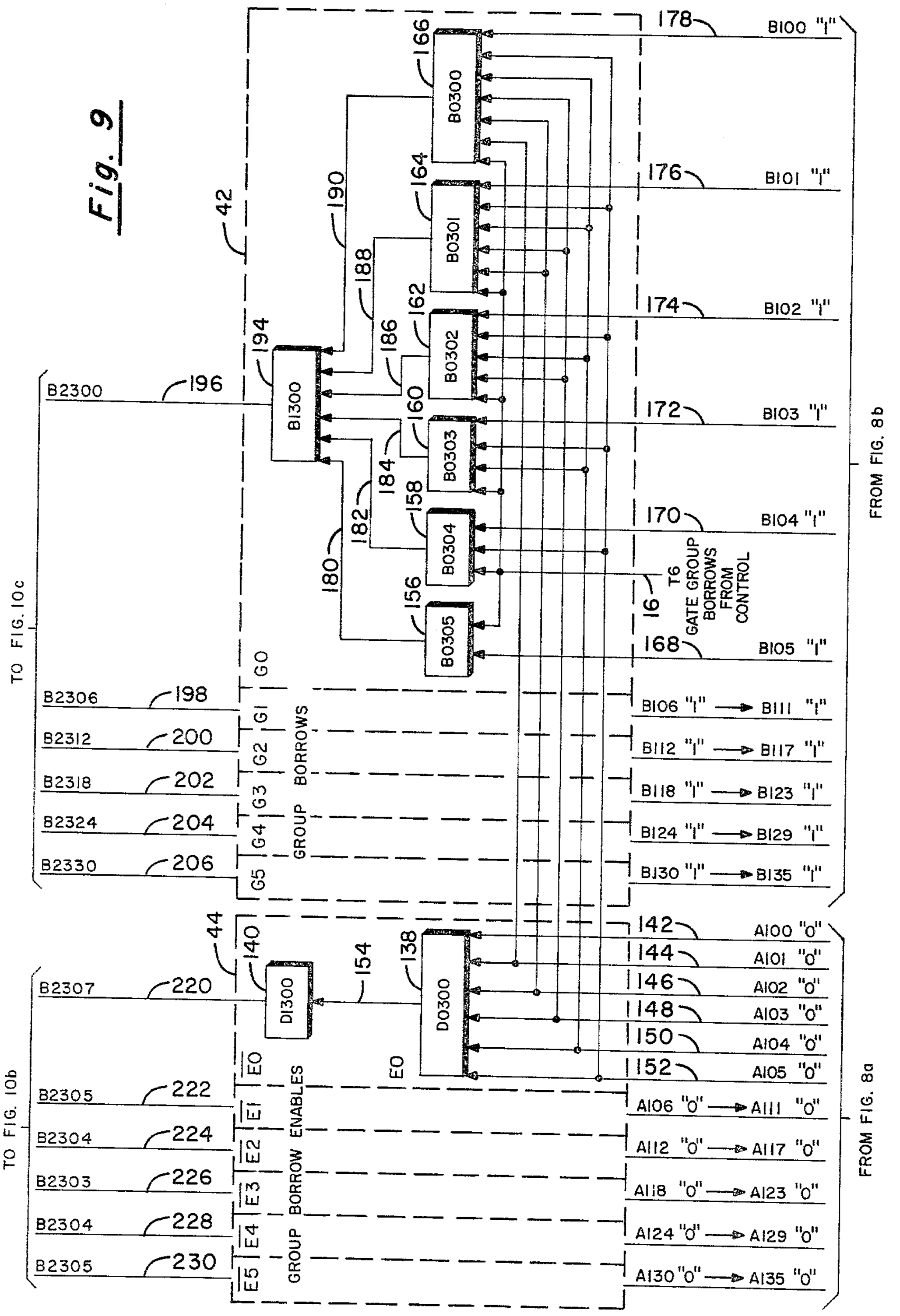
Figure 10A:
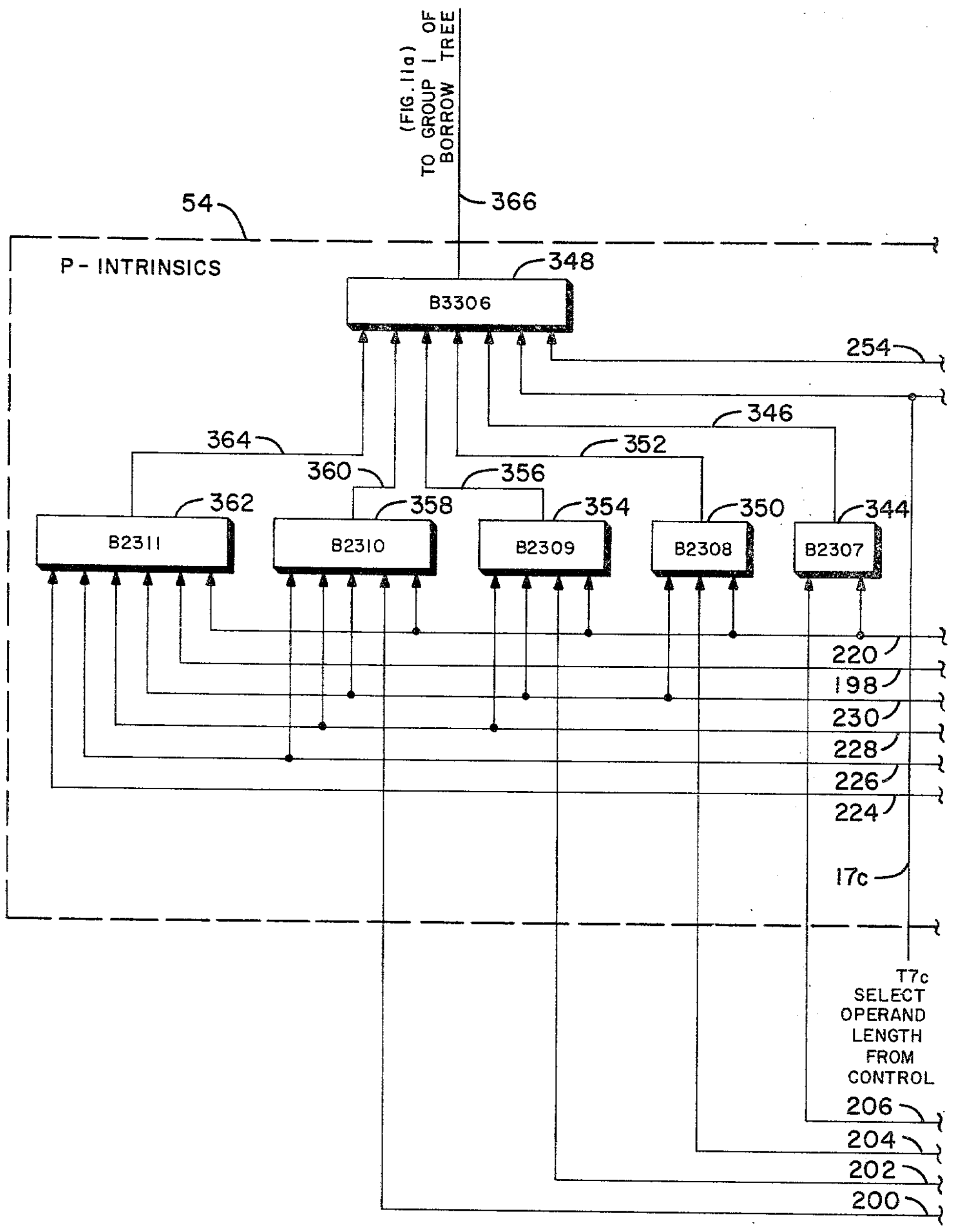
Figure 10B:
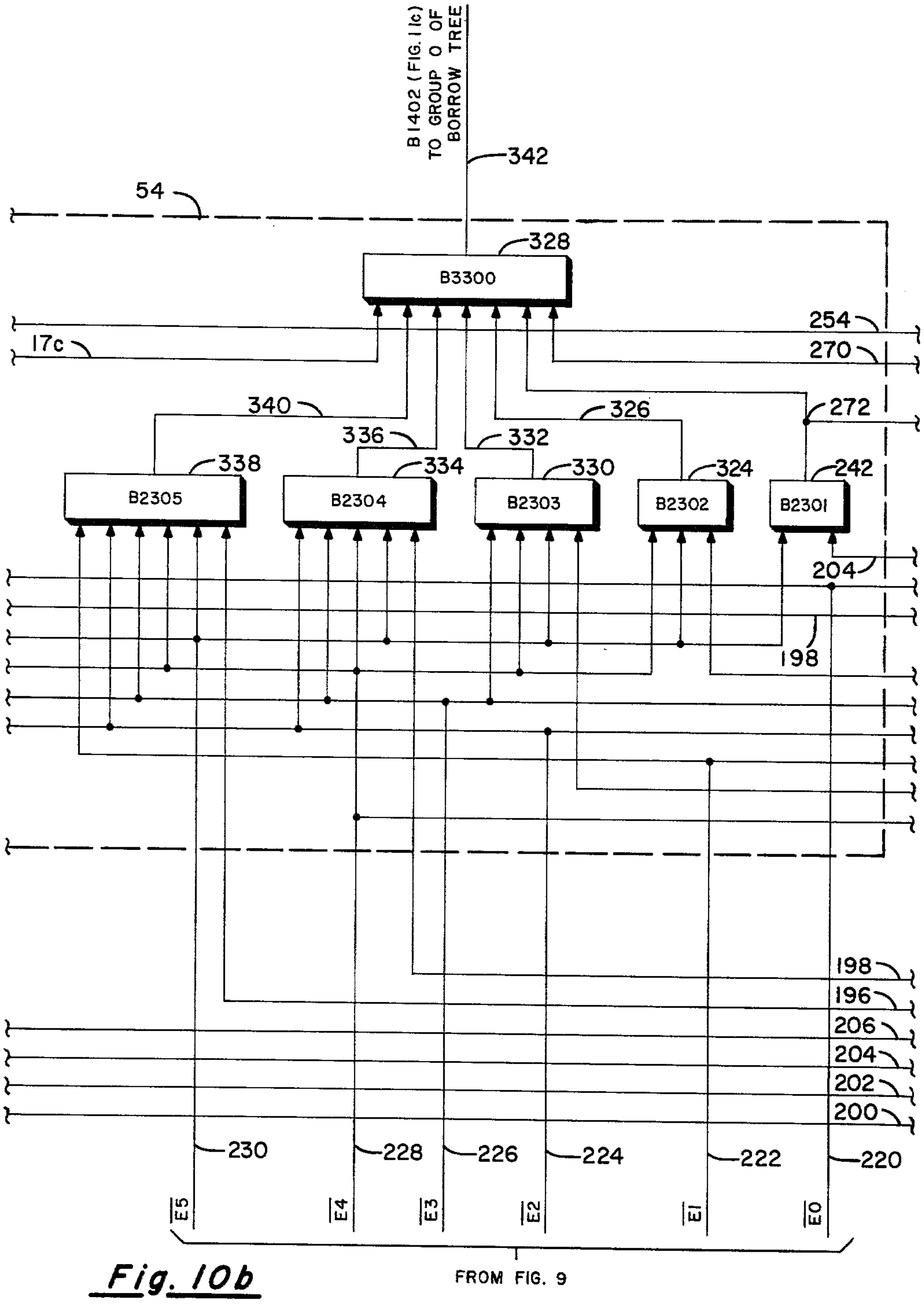
Figure 10C:
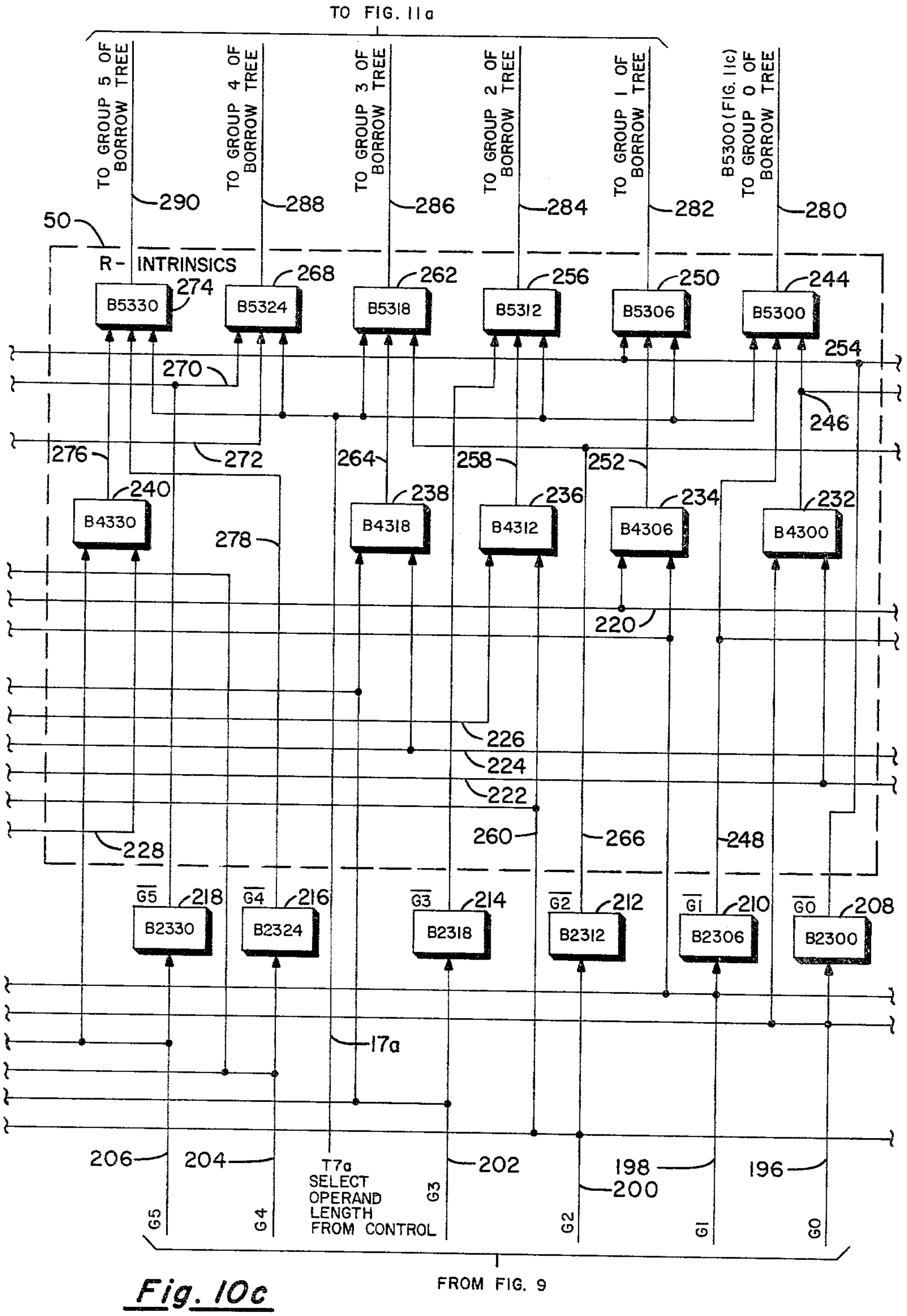
Figure 10D:
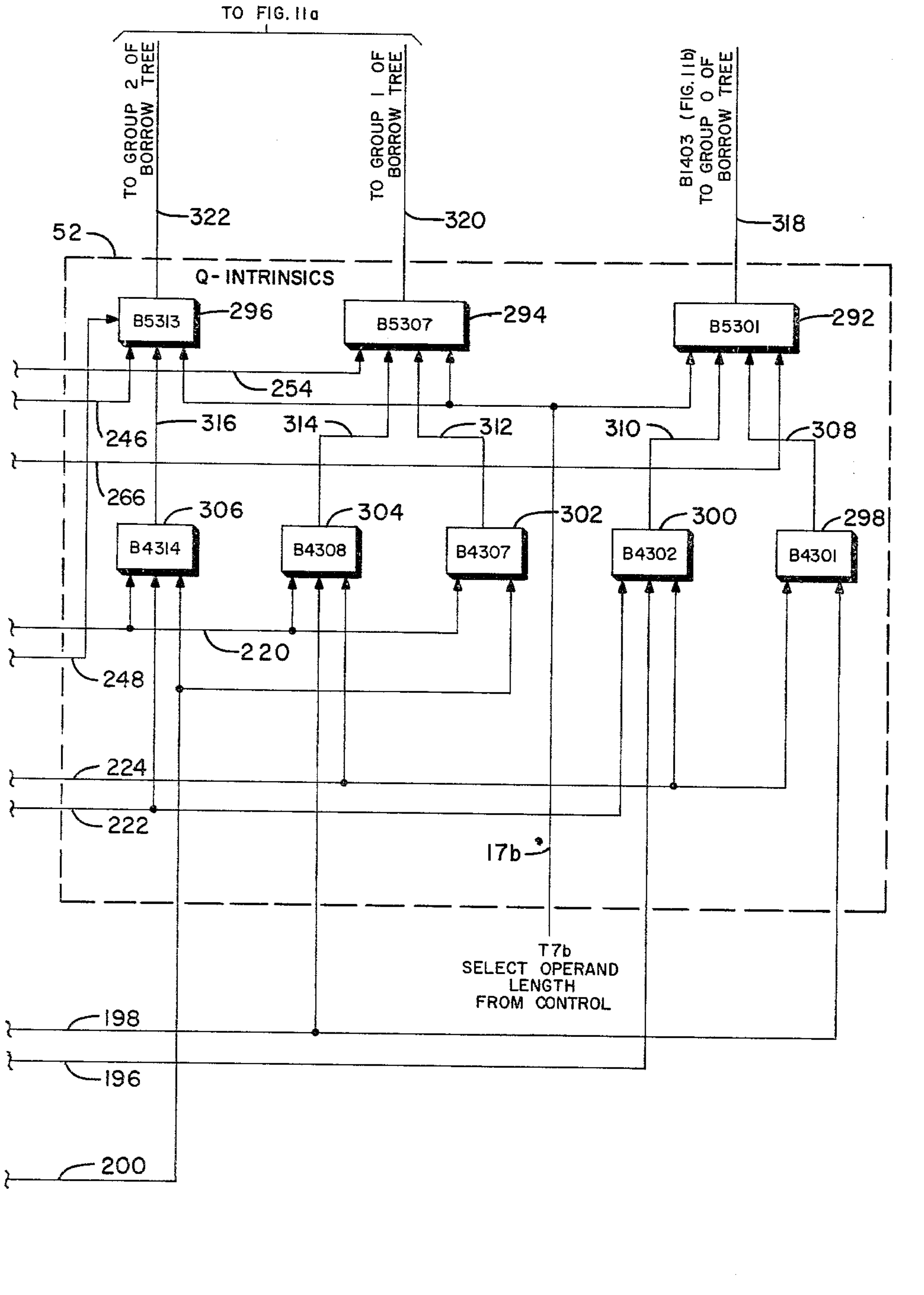
Figure 11A:
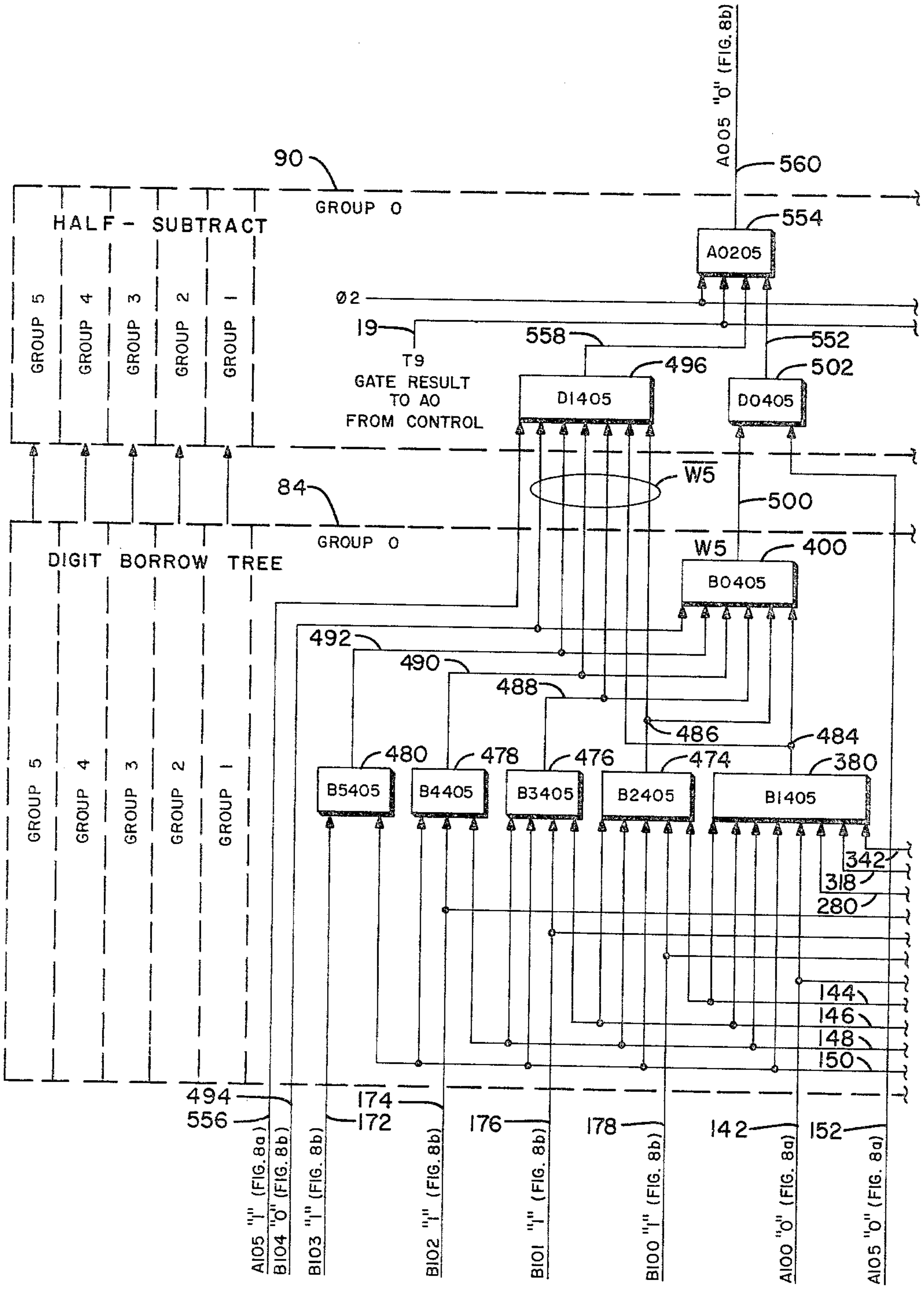
Figure 11B:
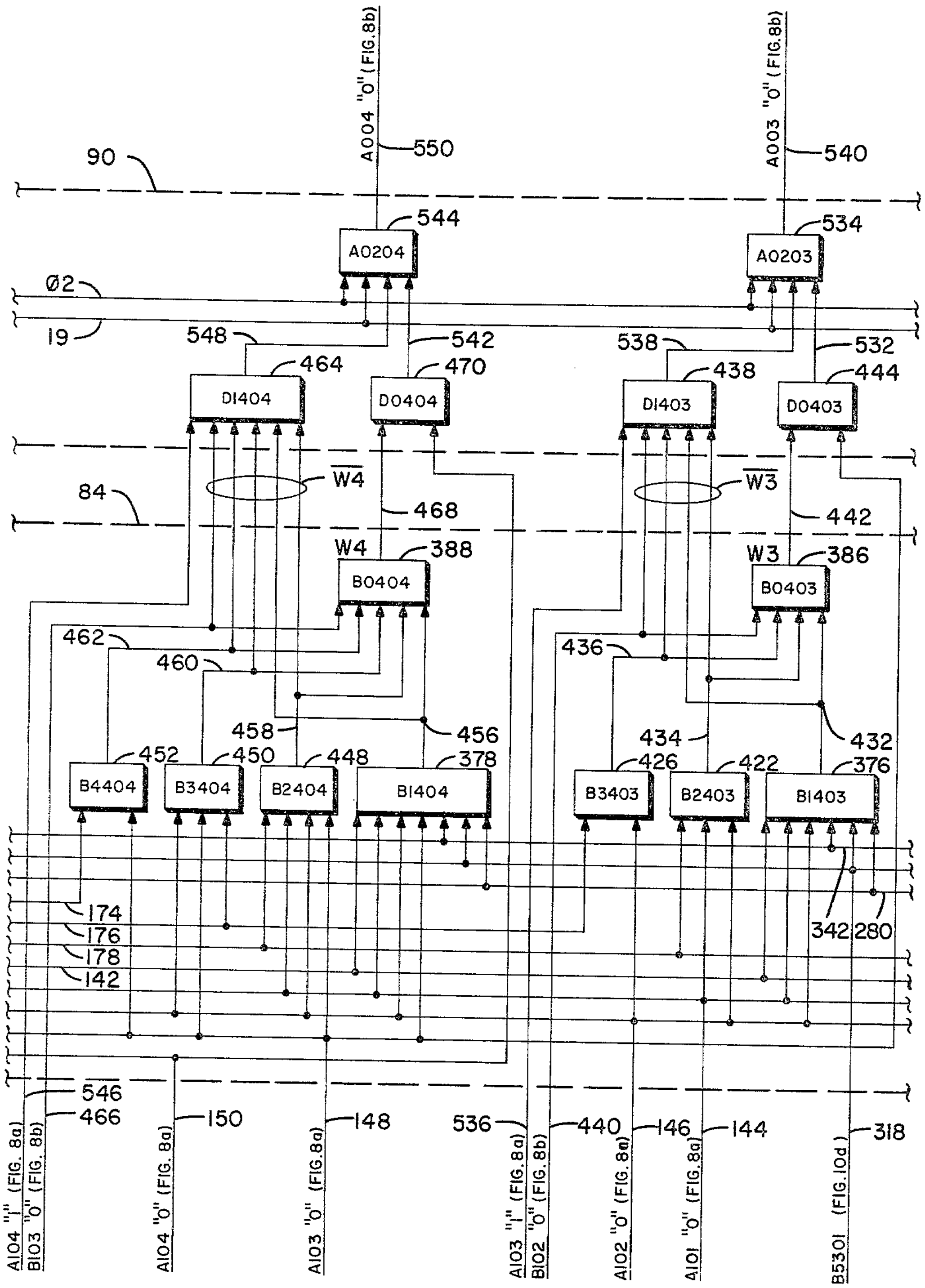
Figure 11C:
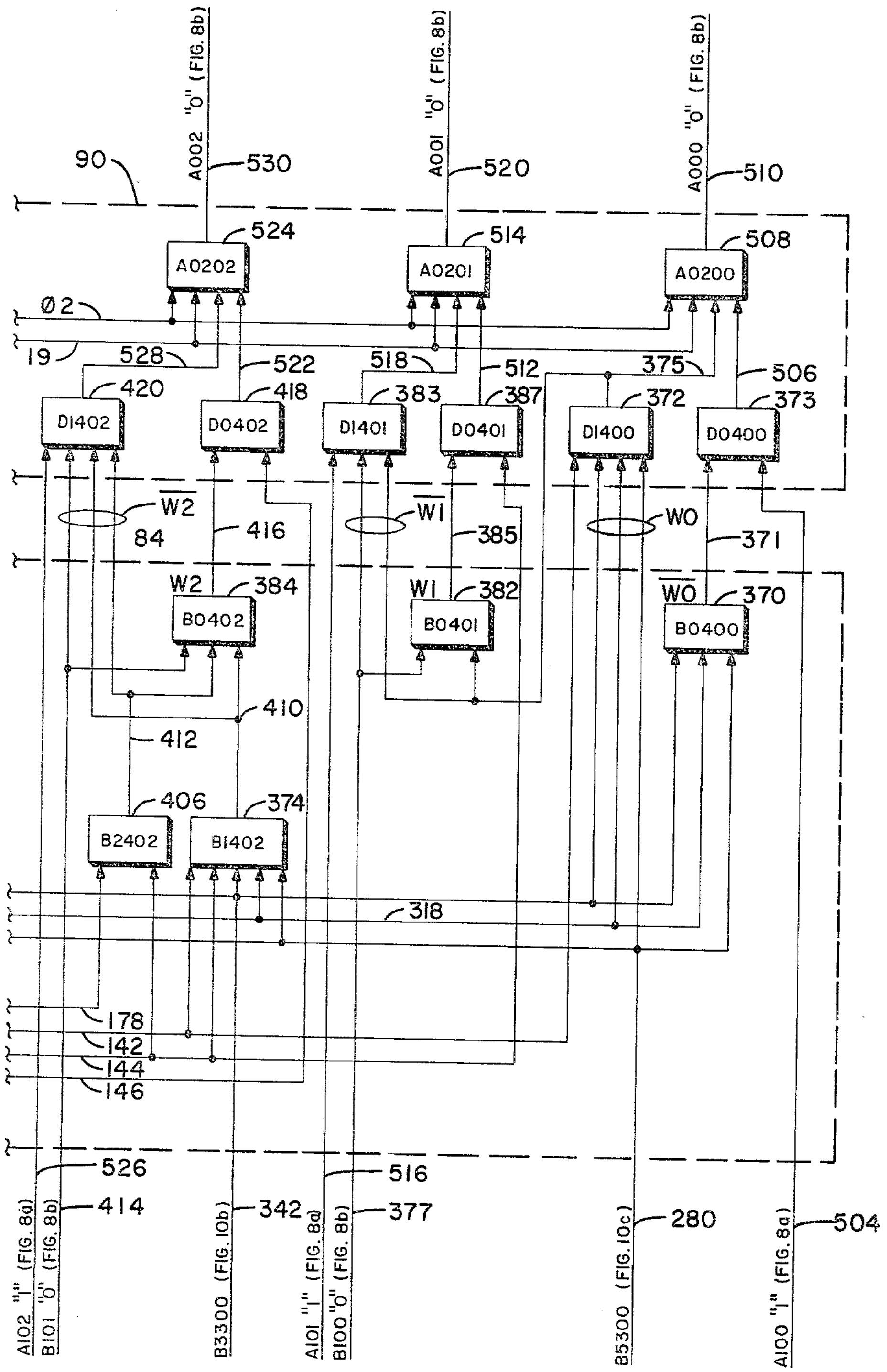

FIG. 8*a* and FIG. 8*b* is the logic circuitry which forms the initial bit-difference and generates the borrow-bits;

FIG. 9 is the logic circuitry which generates the Group Borrow signals and the Group Borrow Enable signals;

FIG. 10*a* and FIG. 10*b* is the logic circuitry which generates the 36-bit operand selection Intrinsic signals;

FIG. 10*c* is the logic circuitry which generates the 12-bit operand selection Intrinsic signals;

FIG. 10*d* is the logic circuitry which generates the 18-bit operand selection Intrinsic signals;

FIG. 11*a* to FIG. 11*c* is the logic circuitry which generates the required borrow-signals and forms the final result of the arithmetic operation.

The invention will appear more clearly from the following detailed description when taken in connection with the accompanying drawings of the preferred embodiment of the inventive idea. The teachings of this invention are applicable to digital computers in general, but the description contained herein will be limited to binary computers.

Since the only digits used in the binary system are zero and one, it is readily adaptable to electronic expression by the presence or absence of a pulse signal. The presence of a pluse is defined as a zero ("0"), and the absence of a pulse may be recognized as a one ("1").

The information contained within a grouping of bits within a register often represents a numerical value. Positional notation is of the techniques for representing such numbers, and is characterized by the arrangement of digits in sequence with the understanding that successive digits are to be interpreted as coefficients of successive powers of the base (radix) of the number system being used. Since this is a binary computer device, the successive digits are interpreted as coefficients of the successive powers of the base 2. These successive digit-positions are referred to numerically from 0 through 35, with the numbers increasing from right to left. The binary-point(s), or radix-point(s), for this embodiment will depend on the operand-length selection. For a single 36-bit operand, the radix-point will be considered to be at the right-most end of a register. For two 18-bit operands, there are effectively two independent radix-points; one at the right-most end of a register and the second separating the 17th and 18th bit positions. Then, in the case involving three 12-bit operands, there are effectively three radix-points; one at the right-most end of an arithmetic register, a second separating the 11th and 12th bit-positions, and the third separating the 23rd and 24th bit-positions.

The positional notation mentioned and described above can be illustrated by applying it to a sample binary number. Thus, the binary number 1100110. (radix point) would be understood to mean:

$$1(2)^6+1(2)^5+0(2)^4+0(2)^3+1(2)^2+1(2)^1+0(2)^0. \text{ (radix-point)}$$

The concept of multiple radix-points within a single register can best be illustrated by diagrams of the following type where the exponential factor within the block represents the maximum unsigned quantity which can be expressed:

36-bit operand—

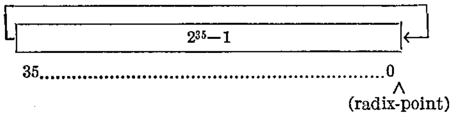

18-bit operands—

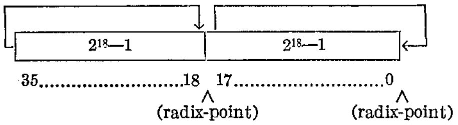

12-bit operands—

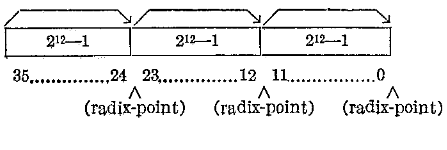

The arrows indicate the paths of end-around borrows for each of the operand length selections.

This embodiment utilizes a 1's complement numbering system, which is well-known in the art. In this arithmetic device a negative number is represented by the complement of the corresponding positive number. The complement is derived from the finite positional notation of the number, and is determined by subtracting each digit from 1. As an example, to form the complement of 14 the following binary calculation would be made:

```
 1 1 1 1
—1 1 1 0  (—14)
 -------
 0 0 0 1  (—14)
```

In this embodiment there are three basic types of control signals. The primary control signals are the Clock signals as illustrated in FIG. 2. These are repetitive and always occur in the same time relation one to another. The Control 10 portion of a digital computer is generally made up of circuitry which effect the carrying out of the instructions in proper sequence, the interpretation of each instruction word, and the application of the appropriate signal pattern to the arithmetic device to control its operation. It is not believed necessary to describe the method of generating this type of control pulse since such method of generation is not pertinent to the operation of this invention. The nature and time relationship of this type of control signal will be described in the detail description as they are utilized. This type of control pulse is distinguishable from the Clock control pulse in that they may or may not occur depending upon the function the computing device is then performing, whereas Clock pulses always occur in the same time relation one to another. A third type of control signal is one which may be derived from data signal manipulation in an asynchronous operation, where the result of a computation reaching a given point in the logic circuitry starts the next sequence. This type of control is characterized by its ability to allow circulation to proceed at the maximum rate allowable by the component delay losses. This invention employs all three of the above described types of control, and in many instances may require the simultaneous occurrence of all three in order to control the proper sequencing of operation of this arithmetic device.

The basic logical element which is utilized in the embodiment of this invention is a NOR circuit which is represented by a rectangular block as shown in FIG. 4. This figure illustrates the ability to employ multiple inputs which may vary in number depending upon the logical connective requirements. The logic equations expressed in FIG. 4 are various ways of stating identical logical properties, and may be derived one from the other using well-known symbolic logic techniques. The overall term NOR is employed to designate each and all of these representations. The letter combination shown within the block may be defined as follows:

(1) The letter "X" refers to a letter notation that associates the particular NOR block with a major section of the device or to register circuitry, e.g., A for the A-Register, etc., (2) The letter "*a*" refers to a numerical representation which most often is employed to designate successive levels of logic between gate points or register levels (see FIG. 9 NOR circuits D0300 and D1300, etc.); and (3) The letter "*b*" refers to a numerical representation ranging from 0 through 9, and is employed to give uniqueness where identical reference designations would otherwise occur (see FIG. 8*a* NOR circuits X0200 and X0300, etc.);

(4) The letters "*cd*" refer to numerical representations of a range 00 through 99 which usually refer to the stage of a particular register that the NOR circuit under consideration is associated with (see FIG. 11*c* NOR circuits B2402 and B1402 representing stage 02, etc.);

The electrical circuitry of a typical NOR circuit is shown in FIG. 3, and comprises diode OR inputs A, B, *n* into a single transistor amplifier-inverter Q, the operation of which is well known in the art. The truth table for the NOR circuit is shown in FIG. 5 and logically can be described as outputting a "0" if any input thereto is a "1," and outputting a "1" only if all inputs to the diode OR circuit are 0's. This is a graphic way of expressing the proposition that neither A nor B nor any input up to *n*, results in an output of 1 at C.

In the embodiments shown, a "1" is arbitrarily represented by a D.C. voltage level of approximately ground potential (0 volts) and a "0" is arbitrarily represented by a D.C. voltage level of approximately −3 volts. In the figures, each of the individual OR inputs into a NOR element, where more than a single input is required, are represented by individual input lines thereto (see FIG. 8*a* NOR circuit X0300 with three input lines, etc.)

The flip-flop comprises a pair of cross-coupled NOR elements 2 and 4 as shown in FIG. 6. This provides a device having two stable states and two input terminals, each of which corresponds with one of the two states. The circuit remains in either state until caused to change to the opposite state by application of the requisite input signal. For purposes of simplification the diagrammatic cross-coupled NOR elements are not used, but instead a block representation as shown in FIG. 7 is used to represent all flip-flop stages. The letter-numeral combination shown at the center of the block is described as follows:

(1) The letter "X" refers to a letter representation of the particular register, e.g., A for the A-Register, etc.;

(2) The first numerical post-script represents the rank of the register where more than one register with the same designation letter exists, e.g., FIG. 8*b* flip-flop A000 (108) represents the A0-Register, FIG. 8*a* flip-flop A$\bar{1}$00 (114) represents the A1-Register, etc.;

(3) The last two numerical post-scripts represent the stage-number within a register of which the particular flip-flop comprises the storage element, e.g., in FIG. 8*a* flip-flop A1$\underline{05}$ (124) represents the fifth stage of the A1-Register, etc.

Each of the flip-flops include a "1" and a "0" input side designated SET and CLEAR, respectively, and corresponding "1" and "0" output side. When in the "0" (Cleared) state, the flip-flop outputs a "1" from the "1" side and a "0" from the "0" side. While in the "1" (Set) state the flip-flop outputs a "0" from the "1" side and a "1" from the "0" side. Putting this in terms of Set and Re-set conditions, the flip-flop outputs a "0" from the "1" side when in the Set condition, and a "0" from the "0" side when in the Re-set or Cleared condition. To set a flip-flop, a "1" must be applied as an input to the Set ($\bar{I}$) input side, and to Clear the flip-flop, a "1" must be fed into the Clear (I) input side. Although in the actual embodiment the flip-flop consists of a pair of cross-coupled NOR circuits, each having a plurality of OR inputs as they are required, for ease of explanation and understanding the OR inputs into the flip-flop are shown diagrammatically as multiple inputs into a block appropriately labeled OR, and only a single input from the OR into the flip-flop is shown. This is done in an attempt to alleviate the problem of understanding the negative logical aspects of the normal operation of the basic NOR circuit.

The operation of this arithmetic device is essentially subtractive in nature. The technique of employing two so-called half-subtractors to obtain the addition or subtraction of two numbers is well-known in the art, and is explained fully in the text "Arithmetic Operations in Digital Computers" by R. K. Richards in chapter 4. In this embodiment the initial half-subtractor is utilized to provide output signals inverted from those normally expected. This was done to fully utilize the inherent operation of NOR circuitry and thereby reduce the amount of required circuitry. This arithmetic device operates in a parallel mode on all digit positions simultaneously. Thus, the term "bit-difference" is understood to mean the bit-by-bit difference formed by the logical operation of the half-subtractors. In performing arithmetic operations by subtractive techniques, it becomes necessary to utilize "borrow" conditions. This is the term applied when two digits are subtracted, one from the other, and the result causes the minuend digit to become less than 0 thereby requiring the next higher ordered minuend digit to be decreased by one. As stated above, this is a device which employs the 1's complement system for performing arithmetic operations, and thereby requires what is called an "end-around borrow" to provide correct results when the result of an arithmetic process changes from positive to negative. This requires that a borrow be propagated from the highest order stage directly to the lowest order stage where it is utilized to provide the correction needed. This can best be understood from the following example:

| | | |
|---|---|---|
| Minuend | 0 1 1 1 0 1 | 29 |
| Subtrahend (−) | 1 0 0 1 0 1 | −(−26) |
| | 1 1 1 0 0 0 | 55 |
| End-around borrow (−) | 1 | |
| | 1 1 0 1 1 1 | The difference |

It is the method and idea of providing the requisite end-around borrow signal paths for the various operand length selections that is the heart of the inventive concept.

Figure 1:
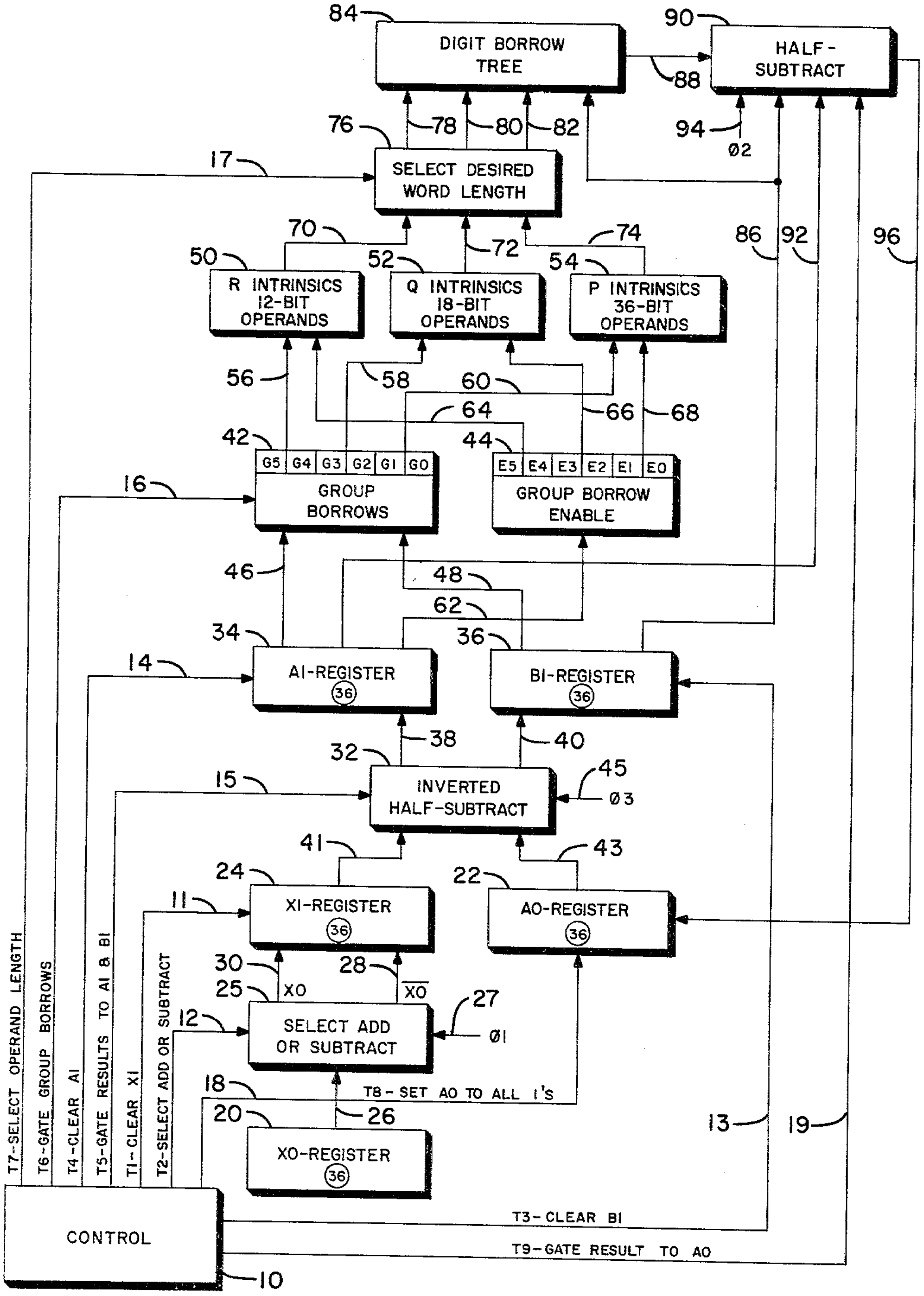
FIG. 1 is a block diagram of an embodiment of a segmented arithmetic device, which incorporates the teachings of the instant invention.

FIG. 1 shows in a block diagram form an embodiment of a segmented arithmetic device including the portions utilized in the implementation and description of the instant invention, but which are not inventive. In FIG. 1 the registers are labeled as such, and the other boxes illustrated represent logical operations required to achieve the objects of this invention for the embodiment shown.

The internal operation of Control 10 will not be described in detail since it would not tend to clarify the operation of this invention. The utilization of control signal transmission paths 11 through 19 will be described in conjunction with the portions of the logic with which they act, but the method of generation of such control pulses will not be described in detail. Their time relationship one to another will be illustrated in conjunction with the control signals generated within the arithmetic device, and with the control signals generated by the Master Clock.

The registers shown in FIG. 1 are of a type well known in the art and basically comprise a plurality of flip-flops, where the flip-flops are utilized for temporary storage of a bit of information in corresponding digit orders. This allows considering the rank group of individual bits in positional notation form as representing a numerical value to the base 2 as described above. The data or information signal transmission paths between registers are appropriately labeled in FIG. 1, and are shown in single-line (cable) form to indicate that all transmission is done in a parallel mode. This means that all bits from a given register are transmitted simultaneously to the next stage of logic, and is to be distinguished from a serial mode of transmission where the bits are sequentially transmitted in corresponding digit order from one register to another. The means for selectively gating between consecutive orders of logic are shown as single lines, but are intended to represent simultaneous gating of each stage of a register. The direction of information flow is in that direction indicated by the arrow heads.

For purposes of this description, assume 36 bits of information pre-set in the X0-Register 20. This grouping of bits can be either the addend(s) for purposes of addition, or the subtrahend(s) for purposes of subtraction. Also assume 36 bits of information pre-set in the A0-Register 22. This grouping of bits can be either the augend(s) for addition, or the minuend(s) for purposes of subtraction.

The means for procuring these two machine words of information are not pertinent to the invention and will not be described. Once these two registers contain the information just described, Control 10 issues control signal T1 to clear the X1-Register 24 via control transmission path 11. This Re-sets each stage of the X1-Register 24 to zero and is necessary as an initializing condition. The following expressions will describe the utilization of this device to perform arithmetic. If it is desired to add to numbers, the following arithmetic relationship would obtain:

(A)+(X)=Sum
(Augend)+(Addend)=Sum

In the process of subtraction, the same arithmetic device can be employed where the following arithmetic relationship is utilized:

(A)+(—X)=Difference
(Minuend)+(—Subtrahend)=Difference

Since the complement of a number in the 1's complement system is the negative representation of that number, it can be seen that selective control of the value represented by the "X" term in the above relationships will yield either the arithmetic function of addition or subtraction. This feature is programmable and is selected by the instruction word, which is translated by Control 10. The control signal T2 thereby generated is transmitted on control path 12 to select the gating of the contents ($\overline{X0}$) of the X0-Register 20 or the complement (X0) of the X0-Register 20 into the X1-Register 24. The information is available in parallel form via data paths 26. The simultaneous occurrence of the control signal T2, $\phi 1$ 27 of the Master Clock, and the information pulses on data transmission paths 26 make the selection 25 to Add by enabling data transmission paths 28; or to Subtract by enabling data transmission paths 30. For Addition the Set condition of each stage of the X0-Register 20 is gated to the Set side of the corresponding flip-flops which comprise the X1-Register 24. For Subtraction the complement of each stage of the X0-Register 20 is gated to the Set side of the corresponding flip-flops of the X1-Register 24. Once this selection has been made, the operation of the remainder of the circuitry is identical for both the process of Addition and Subtraction.

At a time preceding the Inverted Half-Subtract 32 the A1-Register 34 and B1-Register 36, which are auxiliary arithmetic registers, are cleared to all zeros by Control 10 signals T4 on wire 14 and T3 on wire 13, respectively. The data signals contained in the X1-Register 24 (addend(s) or subtrahend(s)) are available to the Inverted Half-Subtract 32 over data transmission paths 41, and the data signals stored in the A0-Register 22 (augend(s) or minuend(s)) are available to the Inverted Half-Subtract 32 over data transmission paths 43. Both the "0" and "1" side output from each register are utilized to accomplish the Inverted Half-Subtract 32. Once the A1-Register 34 and the B1-Register 36 are cleared, Control 10 propagates a pulse T5 on control transmission path 15 which, in combination with $\phi 3$ 45 of the Master Clock, gates the results of the Inverted Half-Subtract 32 into the A1-Register 34 and the B1-Register 36. The inverted bit-by-bit differences are transmitted on data transmission paths 38 to the A1-Register 34, while the propagated borrow signals are transmitted on data transmission paths 40 to the B1-Register 36. By application of well-known symbolic logic methods of simplification the Inverted Half-Subtract 32 logic equations may be illustrated as follows:

$$\text{Inverted Bit-Difference}=\overline{X1}\ \overline{A0}+X1\ A0$$
$$\text{Borrow-Bit}=\overline{A0}\ \overline{X1}$$

Note that the bar ($\overline{\ \ }$) term in the "0" side output from the corresponding flip-flop, and that the unbarred symbol is a "1" side output. Thus, the convention established for this specification is to represent the negation (complement) of the stored signal as an unbarred symbol. The absence of any logical connective symbol is utilized to represent the AND function. The truth table for these expressions is shown below:

| $\overline{A0}$ | $\overline{X1}$ | Inverted bit-difference | Borrow-bit |
|---|---|---|---|
| 0 | 0 | 1 | 1 |
| 0 | 1 | 0 | 0 |
| 1 | 0 | 0 | 0 |
| 1 | 1 | 1 | 0 |

The reason for expressing the operation of this portion of the logic circuitry as "Inverted Half-Subtract" is apparent from the truth table. This 0 follows from the results being the inversion of the expected signal. By way of example when a "1" is subtracted from a "1" in this portion of the circuitry, a difference of "1" is generated, which is the negation of the "0" signal which would normally be expected. The reason the utilization of the negation signal rests on the inherent nature of operation of the NOR circuit which expresses negative aspects of control. The portion of the truth table blocked out by dotted line, where the Inverted Bit-Difference and Borrow-Bits are both zero, is taken care of by the initial clearing of the A1-Register 34 and the B1-Register 36.

Since the exemplary embodiment utilizes a 36-bit machine word, it can be broken into six groups, of six bits each, for the determination of the Group Borrow 42 signal propagation and the Group Borrow Enable 44 signal propagation. The Group Borrow signals 42 utilize the "0" side (Set) outputs from the A-1 Register 34, which are applied as inputs over control transmission paths 46. In conjunction with the A1-Register 34 signals, the outputs of the "1" sides (B1) of the B1-Register 36, which contains the borrow-bits, are applied via control paths 48. The function of the Group Borrow signals 42 is to determine whether a propagated borrow within a group can be satisfied within that group, or must be propagated to one of the next groups of six bits, or must be propagated as an end-around borrow. If a borrow can be satisfied within a group, no Group Borrow signal is generated for that particular group. The propagation of the Group Borrow soignals 42 is synchronized by the T6 gate signal which is generated by Control 10 as an enable input over control line 16. The Group Borrow signals 42 are applied simultaneously to the R Intrinsics 50, the Q Intrinsics 52, and the P Intrinsics 54, over control transmission paths 56, 58, and 60, respectively.

The outputs from the "0" side ($\overline{A1}$) of the flip-flops which comprise the A1-Register 34 are transmitted over control transmission paths 62 to the Group Borrow Enable 44 logic circuitry. The Group Borrow Enable 44 logic divides the applied signals into six-bit groups, and tests each group for a simultaneous occurrence of all "0" inputs. Any group found to consist of all zeros produces a signal which biases the subsequent logic in such a fashion to indicate that a Group Borrow signal propagated from a previous stage cannot be satisfied within the group consisting of all zeros. Under these conditions a borrow from a previous group must be propagated to a subsequent group. The utilization of this logic circuitry reduces the overall borrow propagation time, since it eliminates the need of propagating through large groups of stages where a borrow cannot be satisfied.

The utilization of the end-around borrow function results in essentially a circular register, which is required to perform the arithmetic operation in 1's complement arithmetic. The technique of dividing the circular register device into equal subdivisions is a cyclotomic operation. (Cyclotomy is a mathematical term that refers to dividing a circle into equal parts.) For this embodiment the register is divided into equal subdivisions with all bit-positions being used, hence there is no remainder (unused bits) from the division process. This is a condition of mathematical congruence which satisfied the following equation:

$$X = a \pmod{m}$$

where $X-a$ is exactly divisible by $m$. When such a situation exists, the resulting cyclotomic relationship is termed an intrinsic function. This, then, is the derivation for the term "intrinsic" employed in the description of the selection of the operand length, by performing division of the basic arithmetic register, and supplying the requisite end-around borrow signal paths. It should be noted that the system of employing equal size segments is characteristic of this embodiment only, and that the inventive concept of a segmented arithmetic device is not limited to such equal size operands.

The Group Borrow Enable 44 signals are applied simultaneously to the R Intrinsics 50, Q Intrinsics 52, and P Intrinsics 54, over control transmission paths 64, 66, and 68, respectively. The simultaneous transmission of the Group Borrow 42 signals over control paths 56 and the Group Borrow Enable 44 signals over control paths 64, as inputs to the R Intrinsics 50 results in a logical combination which selects the condition for three 12-bit operands. This combination selects the appropriate end-around borrow control paths for the three parallel operands. The simultaneous transmission of the Group Borrow 42 signals over control paths 58 and the Group Borrow Enable 44 signals over control paths 66, as inputs to the Q Intrinsics 52 operates to select the mode of operation of two 18-bit operands, and establishes the appropriate end-around borrow paths for the two parallel operands. The transmission of the Group Borrow 42 signals over control paths 60 and the Group Borrow Enable 44 signals over control paths 68 to the P Intrinsics 54 selects the full machine word operand mode of operation, and provides a single 36-bit operand for this embodiment. The R Intrinsics 50, the Q Intrinsics 52, and the P Intrinsics 54 are transmitted over control paths 70, 72, and 74, respectively, to the logic circuitry which enables selection of the desired word length 76. The operand length is selected by Control 10 which propagates control pulses T7 over control transmission path 17. As a result of this selection, one of the control paths 78, 80 or 82 is enabled and applied to the Digit Borrow Tree 84, thereby selecting the appropriate control signal circuitry to generate the end-around borrow path or paths. It can be seen that all modes of operation are translated and carried forward up to this final control selection point 76, but that only one mode of operation is enabled into the Digit Borrow Tree 84 effectively. Disabling the undesired operand lengths at this point 76 requires a minimum amount of control circuitry, and provides a savings over operand length selection at any preceding point.

The "0" side ($\overline{B1}$) of the flip-flops which comprise the B1-Register 36 are transmitted over control paths 86 to the Digit Borrow Tree 84. These signals represent borrows that were generated during the initial Inverted Half-Subtract 32, and when combined with the selected Intrinsic signals in the Digit Borrow Tree 84, provide the final borrow condition for the arithmetic operation. The resulting borrow pulses are applied over control transmission paths 88 to the final Half-Subtract 90. The operation of the Digit Borrow Tree 84 is to orient the propagated borrows within the particular group, and provide for the end-around propagation of borrows as they may be required.

The A0-Register 22, where the final resultant is stored, is set to all ones by Control 10 which propagates control signal T8 over control transmission path 18 as a "1" to the Set side of all of the flip-flops in the A0-Register 22. Following the application of control pulses T8 to the A0-Register 22 the Half-Subtract 90 is performed. The final Half-Subtract 90 is the result of the logical combination of the inputs of the borrow signals from the Digit Borrow Tree on cable 88, the "1" side (B1) outputs of the B1-Register 36 flip-flops transmitted over information paths 86, and the "1" side ($\overline{A1}$) outputs of the A1-Register 34 flip-flops transmitted over information paths 92. The resulting quantity is synchronized by $\phi 2$ 94 of the Master Clock simultaneously with the application of the T9 control pulse over control path 19, which gates the final answer over information transmission paths 96 to the A0-Register 22. It should be noted at this point that the A0-Register 22 consists of flip-flops as shown in FIGURE 8*b*. The final answer stored in these flip-flops is detected by conventional techniques any of which determine whether a "1" or a "0" is stored by any particular flip-flop. Such techniques indicated by connections to the respective flip-flops has been omitted in the drawings for sake of clarity since they form no part of this invention. The resulting digits representing the resulting quantities are applied as inputs to the Clear ("0") side of the A0-Register 22 flip-flops. The technique of setting the A0-Register 22 to all ones, and then applying the resultant signals to the Clear side of the A0-Register 22 flip-flops saves one stage of inversion. This due to the inherent operation of Half-Subtract 90 which provides an output of polarity opposite in numerical value from the desired result. The logical operation of the Half-Subtract 90 is that of a well-known subtractive device, and is not of the Inverted Half-Subtract 32 type described earlier.

FIG. 8 and FIG. 8*b* provide a more detailed illustration of the portion of the segmented arithmetic device which performs the initial Inverted Half-Subtract 32. Characteristic stages of each level of logic are shown, and the remainder of the repetitive logic circuitry is blocked in. The blocking in is done to simplify the explanation of the embodiment of this invention. All of the registers in FIG. 8 are comprised of 36 flip-flops, of the type illustrated in FIG. 6 and FIG. 7, with only those stages shown that are required to understand the operation of this embodiment.

For this explanation assume that 36 bits of information, either the addend(s) or subtrahend(s), are pre-set in the X0-Register 20, and are available for computation. Further assume that 36 bits of information, either the augend(s) as minuend(s), are stored in the A0-Register 22, and are available for computation. As another initial condition, it is necessary that the X1-Register 24 be in the Cleared, e.g., each flip-flop is cleared to the "0" condition. This is accomplished by the application of the T1 ("1") control pulse being applied over control transmission paths 11 to the Clear ("0") side of all of the flip-flops in the X1-Register 24.

As indicated above, this arithmetic device is capable of performing both addition and subtraction. This feature is programmable and is determined during the translation of a given instruction. This selection is provided by control signals T2 which are applied over control transmission paths 12*a* and 12*b* to the selection logic 25. These inhibit and enable signals are applied simultaneously to all stages of the selection logic 25. For the addition process, the normal contents ($\overline{X0}$) of X0-Register 20 are transmitted directly to the X1-Register 24, but for the subtraction process the complement (X0) of the contents of the X0-Register 20 is transmitted to the X1-Register 24. Thus, by proper selection of the "0" or "1" side transmission path from the X0-Register 20 the selection to either add or subtract can be made. Since both the "0" and "1" side output from the X0-Register 20 flip-flops are applied in a static state over data transmission paths 26 to the selection logic 25, the simultaneous occurrence of $\phi 1$ 27 of the Master Clock and the enable control pulse T2 over control paths 12*a* or 12*b* will select the arithmetic mode of operation.

For purposes of the following discussion, assume that a "1" is stored in FF X000 labeled 100, thus providing a "1" output on wire 26*b* and a "0" output on wire 26*a*. For the process of addition, control pulses T2 are applied as an enable ("0") on control path 12*a* and is applied to NOR circuit X0300 which is labeled 102. A "0" enable pulse as an input to NOR circuit X0300 allows X0300 to provide an output on wire 28. This output is determined only by the input to NOR circuit X0300 which is transmitted over wire 26*a* from the "1" side of FF X000. Since in this example a "0" is transmitted on wire 26*a* to NOR circuit X0300, the simultaneous application of this information signal, and the control pulses $\phi 1$ 27 and the T2 control enable provides a "1" signal output on wire 28 (see FIG. 5 for the truth table for the NOR circuit operation). It will be noted that the output signal transmitted on wire 28 is the same as the Set ("0") output of FF X000, hence the net effect has been to set the stage (FF X100) of X1-Register 24 to the same state as the corresponding stage of the X0-Register 20, and thereby satisfy the condition required for addition. An inhibit ("1") signal applied on control line 12*b* to NOR circuit X0200 labeled 104 effectively blocks the transmission of any Set signal from FF X000 that may be carried on wire 26*b*, from being applied as an input to FF X100, and will in all cases apply only a "0" on wire 30 for this example. Recalling that a "1" signal is required to Set the flip-flop, the application of a "0" signal from the inhibited circuit (X0200) will have no effect on the operation of the subsequent stage.

For the process of subtraction the control pulses T2 applied on control lines 12*a* and 12*b* are just reversed from the preceding description. This means that NOR circuit X0200 is enabled while NOR circuit X0300 is inhibited, thus providing on line 30 the complement of the current logical signal state of FF X000 as an input to FF X100. In this example a "1" signal is again assumed to be stored in FF X000, and means that a "1" signal will be supplied as an output from the "0" side, and applied as an input signal on wire 26*b* to NOR circuit X0200. Referring to the truth table shown in FIG. 5, it can be seen that this "1" input signal to NOR circuit X0200 in combination with the enable signal T2 and $\phi 1$ 27 of the Master Clock results in an output signal of "0" on wire 30. This "0" signal will not alter the status of FF X100, hence will leave a "0" signal stored as a result of the original clearing of the X1-Register 24 by control pulse T1. The result is that where a "1" was stored in FF X000, a "0" signal (the complement) is stored in the corresponding stage FF X100 of the X1-Register 34. The inhibit ("1") signal applied on control line 12a will result in a "0" output from NOR circuit X0300 on wire 28, irrespective of the input applied to X0300 from FF X000 on wire 26*a*. A "1" is required to Set a flip-flop, and since only "0's" are applied as inputs to FF X100, it is seen that the state of FF X100 will not be altered. This operation complies with the "1's" complement system of performing arithmetic employed in this arithmetic device. The remaining stages of the X0-Register 20 are transmitted in a like manner through the selection control logic 25 to the X1-Register 24. Once this selection is made the remainder of the operation of this arithmetic device is identical for both addition and subtraction.

Control pulse T3 is a "1" signal on wire 13 applied simultaneously as an input to the Clear ("0") sides of all of the flip-flops in the B1-Register 36, and Re-sets this register to the "0" state. Control pulse T4 is a "1" signal on wire 14 applied simultaneously to the "0" sides of all of the flip-flops in the A1-Register 34, and Re-sets this register to the "0" state. Clearing the A1-Register 34 and B1-Register 36 is a necessary initial condition for the performance of the Inverted Half-Subtract 32.

The Inverted Half-Subtract 32 logic circuitry operates in a parallel bit-by-bit manner for the combination of the information stored in the X1-Register 24 and the A0-Register 22. For that reason a single illustrative stage can be utilized to explain all of the 36 stages required for this embodiment. The operation of this stage can be understood by reference to the following logic equations:

$$\text{Inverted Bit-Difference} = \overline{X1}\,A0 + X1\,\overline{A0} \qquad (1)$$

$$= X1\,A0 + \overline{X1}\,\overline{A0} \qquad (2)$$

$$\text{Borrow-Bit} = \overline{A0}\,\overline{X1}$$

The bar ($\overline{\ \ }$) symbol in the foregoing logic equations are utilized to indicate the output signals from the "0" side of the represented flip-flop. Again, the space ( ) connective function between symbols represents the logical AND functions, and the plus (+) connection function between symbols represents the logical OR function. These symbolic representations are followed throughout the remainder of this specification. Due to the inherent nature of the operation of NOR circuitry, Equation 2, which represents the bit-difference logic, is preferred for explanation of the operation of the Inverted Half-Subtract 32. This form of the logic equation may be derived by application of well-known techniques of symbolic logic representation. To aid in the application of these logical equations to the circuitry being considered the following truth table is provided:

| A0 | X1 | Inverted bit-difference | Borrow-bit |
|---|---|---|---|
| 0 | 0 | 1 | 1 |
| 0 | 1 | 0 | 0 |
| 1 | 0 | 0 | 0 |
| 1 | 1 | 1 | 0 |

The signals necessary to satisfy all terms of this logic equation are both the "0" and "1" side outputs from the flip-flops in the X1-Register 24 and the A0-Register 22. The "0" side output of FF X100 is transmitted over information path 41*a* as an input to NOR circuit D2500 labeled 110, and the "0" side output of FF A000 labeled 108 is applied over wire 43*a* as an input to NOR circuit D2500. This supplies the logical combination ($\overline{X100}\,\overline{A000}$) of signals which is required for a portion of the inverted bit-difference Equation 2, and also provides the logical combination which results in the borrow-bit generation. The borrow-bit signal is supplied at the output of NOR circuit D2500 and is transmitted over wire 40 as an input to the Set ("1") side of FF B100 which is labeled 126. At the same time, the "1" side output of FF X100 is transmitted over wire 41*b* as an input to NOR circuit D3500 labeled 112, and the "1" side output of FF A000 is applied over wire 43*b* as an input to NOR circuit D3500. It can be seen that this logical combination (X100 A000) of signals provides for the remainder of the terms required in the inverted bit-difference logic Equation 2. The operation of the Inverted Half-Subtract 32 is synchronized by the application of $\phi 3$ 45 of the Master Clock simultaneously with the application of gate control pulse T5. The proper application of these enable ("0") signals gates the results to the A1-Register 34 and the B1-Register 36. The result of the logical combinations of these signals is the inverted bit-difference which is applied as an input on wire 38 to the Set ("1") side of the FF A100 labeled 114.

To illustrate the operation of the Inverted Half-Subtract 32 logic by way of example, assume that FF X100 stores a "1" and that FF A000 stores a "1," such that a "1" signal is transmitted over wire 41*a* from the "0" side of FF X100 as an input to NOR circuit D2500, and a "1" signal is transmitted over wire 43*a* from the "0" side of FF A000 as an input to NOR circuit D2500. By reference to the above illustrated truth table it can be seen that this results in a "0" output on line 40, which will not set FF B100 for a borrow condition, nor will it set FF A100 to indicate a bit-difference. The output signal from the "1" side of FF X100 on wire **41*b* is applied as an input to NOR circuit D3500, and the "1" side output signal of FF A000 is applied as an input over wire 43*b* to NOR circuit D3500. Since both of these outputs are "0" for this example, the condition for outputting a "1" from NOR circuit D3500 is met, and will result in a "1" being transmitted over wire 38** to the Set ("1") side of FF A100, hence satisfies the inverted bit-difference condition. This illustration provides the sample case where an inverted bit-difference signal is generated but where a borrow-bit signal is not generated.

In the example situation where FF X100 and FF A000 have zeros stored in them respectively, the operation goes forward in the same manner as far as the generation of an inverted bit-difference signal is concerned, but in this case a borrow-bit signal is also generated. The "0" side outputs of flip-flops X100 and A000 propagate "0" pulses over wires **41*a* and 43*a* respectively which are both applied as input signals to NOR circuit D2500. The simultaneous occurrence of these "0" signals result in NOR circuit D2500 providing a "1" signal on wire 40 which is applied as an input to the Set ("1") side of FF B100, and as an input on wire 38** to the Set ("1") side of FF A100. This operation illustrates the generation of an inverted bit-difference signal, and also a borrow-bit signal.

The portion of the truth table blocked in with the dotted line illustrates the condition of the inverted bit-difference being a "0" signal, and borrow-bit being a "0" signal. These conditions are taken care of by initially clearing the A1-Register 34 and the B1-Register 36 prior to the performance of the Inverted Half-Subtract 32. The reason for employing the Inverted Half-Subtract 32 logic circuit configuration in this application is due to the inherent operation of NOR logic. The utilization of this logical configuration saves one stage of inversion between what would be called a "normal" Half-Subtract and the inputs to the A1-Register 34 and B1-Register 36. This added stage of inversion would be required if a subtractive device of a so-called standard configuration were employed here. All stages of the Inverted Half-Subtract 32 logical operations are performed simultaneously with the bit-difference signals being transmitted to the A1-Register 34 and the borrow-bits being transmitted to the B1-Register 36 in parallel.

FIG. 9 is an exemplary embodiment of the circuitry required to provide Group Borrow 42 signals and the Group Borrow Enables 44. As defined above, a group is the consideration of 6 adjacent digit positions as an entity for the propagation of borrow signals. This allows group borrow-bit signal propagations to bypass groups in which the desired borrow can not be satisfied, and instead to proceed to a group within which the Borrow can be satisfied.

The function of the Group Borrow Enables 44 logic circuitry is to determine for 6-bit groupings of the stages of the A1-Register 34 whether or not a "1" signal is present in any of the stages within the group being considered. The group Borrow Enable 44 portion of the logic circuitry comprises 6 parallel sets of NOR circuit logic elements for which one illustrative example is sufficient to describe the operation of all six. NOR circuit D0300 which is labeled 138 is the primary logical element for Group Borrow Enable 0 (E0). The zero side ($\overline{A1}$) outputs of the flip-flops comprising the six lowest ordered stages of A1-Register 34 are applied as inputs to NOR circuit D0300 over wires 142, 144, 146, 148, 150, and 152. Since the "0" side output from the flip-flops is employed, the following logical equation represents the logical connective function of NOR circuit D0300;

$$E0=\overline{A105}\ \overline{A104}\ \overline{A103}\ \overline{A102}\ \overline{A101}\ \overline{A100}$$

This method of expressing the logical connective function of NOR circuit D0300 provides an understanding of the technique used to combine six adjacent stages and provide a resulting output which indicates the presence or absence of a "1" signal in any of the stages, and thereby indicates whether or not a borrow propagated into the group can be satisfied. The result of the logical combination of the input signals by NOR circuit D0300 is labeled E0, and will be a "1" signal only when all inputs are "0's" (see FIG. 5). The E0 signal is applied over wire 154 as an input to NOR circuit D1300 which is labeled 140. The only logical function performed by NOR circuit D1300 is inversion, hence its output will be $\overline{E0}$ on wire 220. When all six stages of A1-Register 34 store "0" data signals, the output of NOR circuit D1300 will provide a "0" signal which may be utilized as an enable to by-pass the group tested for satisfaction of the borrow request. The logical signal manipulation performed by the circuitry supplying the $\overline{E1}$ through $\overline{E5}$ output signals operates in a manner substantially identical to that just described for $\overline{E0}$, hence a detailed description of their operation is believed to be of no benefit in understanding the operation of this embodiment. Logic equations to express the operation of these circuits are of a nature similar to the one expressed for the E0 signal may readily be derived from the corresponding 6-bit groupings of the A1-Register 34.

The function of the Group Borrow 42 logic circuitry is to propagate a borrow signal from a group of six bits which cannot satisfy the borrow request to the next group of six bits which can satisfy the propagated borrow. It is the combined operation of the Group Borrow signals 42 and the Group Borrow Enable signals 44 which determine into which group a propagated borrow request will fall. The end-around borrow is controlled by the appropriate selection of the desired operand length which controls the selection of the Intrinsic logic circuitry. Again, it is sufficient to describe one stage of six bits to illustrate the operation of all of the Group Borrow 42 logical networks. To determine whether or not a borrow request is to be propagated from one stage to another stage, it is necessary to examine both the bit-difference which resides in a stage of A1-Register 34 and the corresponding borrow-bit which is stored in the corresponding stage of the B1-Register 36. Once a borrow propagation condition has been determined to exist within the group, it becomes necessary to consider all succeeding higher ordered stages within the group to determine whether or not a Group Borrow signal will be generated, e.g., whether the borrow can be satisfied within the group. As an example, should a borrow be propagated from stage "00" (FF B100 stores a "1" signal), and there are no "1" signals stored in the next five higher ordered stages of A1-Register 34, the condition would be satisfied for the propagation of a Group Borrow signal. Thus, it can be seen that any one of six possible bit-combinations of the stages of the B1-Register 36 and the A1-Register 34 will result in propagation of a Group Borrow signal. NOR circuits B0305 labeled 156, B0304 labeled 158, B0303 labeled 160, B0302 labeled 162, B0301 labeled 164, and B0300 labeled 166, receive input signals from the "1" side outputs of flip-flops B105 labeled 168, B104 labeled 170, B103 labeled 172, B102 labeled 174, B101 labeled 176, and B100 labeled 178 of the B1-Register 36 via control transmission path 168, 170, 172, 174, 176 and 178, respectively. Control pulse T6 is transmitted over line 16 and is supplied as an enable input to all of the NOR circuits of this level in the Group Borrow logic 42. This signal is utilized to synchronize the propagation of the Group Borrow pulses. In addition to the input signals from B1-Register 36, the "0" side output from the corresponding flip-flops of the A1-Register 34 are applied in various combinations to the NOR circuits comprising the Group Borrow 42 logic circuitry. It can be seen that a borrow signal propagated from FF B105 ("1" stored) and applied as an input to NOR circuitry D0305 will in and of itself result in a Group Borrow condition being satisfied. The output from NOR circuit B0305 is applied on wire 180 as an input to NOR circuit B1300 labeled 194. Since the "1" side of the B1-Register 36 flip-flops are used, a borrow signal being present will supply a "0" input signal to NOR circuit B0305 which is thereby inverted. The resulting "1" signal is applied as an input to NOR circuit B1300. Since any "1" input signal to a NOR circuit will result in a "0" signal output, the resulting output from NOR circuit B1300 on wire 196 will be a "0" enable signal. The "0" side ($\overline{A1}$) of FF A105 is applied as an input to NOR circuit B0304 in conjunction with the "1" side (B1) output of FF B104. The simultaneous occurrence of a "1" (borrow) being stored in FF B104, and a "0" being stored in FF A105, thereby rendering it incapable of satisfying the borrow, will result in the propagation of the Group Borrow signal. The two "0" signals result in a "1" signal being applied on wire 182 as an input to NOR circuit B1300. Again, the occurrence of a "1" input signal to NOR circuit B1300 will result in a "0" output signal on wire 196 irrespective of the condition of the other input terms. This follows from the fact that the propagated borrow can not be satisfied in the next stage (A105) of the A1-Register 34, but instead must be propagated to the next group in order to be satisfied. In addition to the "1" side input from FF B103 NOR circuit B0303 receives input signals from the "0" sides of FF A104 and FF A105. Therefore, the condition when FF B103 stores a "1" (signifying a borrow) and FF A105 and A104 both store "0's," the conditions are met for the propagation of the Group Borrow signal. This results from the fact that the next higher ordered stages within the A1-Register 34 can not satisfy the propagated borrow within the group. In a similar manner, NOR circuitry B0302 receives inputs from the "0" sides of flip-flops A105, A104, and A103; NOR circuit B0301 receives inputs from the "0" side of flip-flops A105, A104, A103, and A102; and finally, NOR circuit B0300 receives inputs from the "0" side of flip-flops A105, A104, A103, A102, and A101. These inputs are in addition to the inputs from the corresponding stages of the B1-Register 36. To satisfy the condition required for the propagation of Group Borrow signal from any of these stages requires the existence of the condition of a "1" being stored in the corresponding stage of the B1-Register 36, and all higher ordered stages of the A1-Register 34, storing zeros. The result of the logical combination of the input signals NOR circuit B0305, B0304, B0303, B0302, B0301, and B0300 are applied as inputs to NOR circuit B1300 on lines 180, 182, 184, 186, 188, and 190, respectively. The following higher level logic equation represents the connective requirements that must be satisfied in order to propagate the Group Borrow signal (G0):

$$G0=B105+B104\,\overline{A105}+B103\,\overline{A104}\,\overline{A105}+B102\,\overline{A103}\,\overline{A104}\,\overline{A105}+B101\,\overline{A102}\,\overline{A103}\,\overline{A104}\,\overline{A105}+B100\,\overline{A101}\,\overline{A102}\,\overline{A103}\,\overline{A104}\,\overline{A105}$$

It should be noted that control pulse T6 is applied to each stage of the Group Borrow 42 logic as a synchronizing gate pulse, but that it is not included in the above mentioned logic equation, since it is in the nature of a gating constant enable that must appear in each term. The remaining five stages of the Group Borrow 42 logic operates in exactly the same manner with their corresponding combination of inputs of B1-Register 36 and A1-Register 34. Logic equations similar to the one illustrated above can readily be generated to illustrate the logical operation of this group of logic.

The Group Borrow signals 42 and the Group Borrow Enable signals 44 are applied in combination to the 12-bit operands R Intrinsics 50, the 18-bit operands Q Intrinsics 52, and the 36-bit operand P Intrinsics 54 to determine the required end-around borrow control circuitry. FIGS. 10*a* through 10*d* illustrate the operation of this logic circuitry.

The operation of the R Intrinsics 50 will be described in detail, and characteristic stages of the Q Intrinsics 52 and P Intrinsics 54 will also be described. Control pulse T7*a* is applied on wire 17*a* is applied as an enable when the 12-bit operand length is selected. It is this enable applied simultaneously to all six stages of the R Intrinsic logic which permits the selection of three end-around borrow paths. The Group Borrow 42 output signals G0 through G5 are applied as input signals (see FIG. 10*c*) over wires 196, 198, 200, 202, 204 and 206, to NOR circuit B2300 labeled 208, B2306 labeled 210, B2312 labeled 212, B2318 labeled 214, B2324 labeled 216, and B2330 labeled 218, respectively. Since the Group Borrow 42 logic circuits output a "0" when the Group Borrow condition is satisfied, it provides essentially an enable condition. The NOR circuits just mentioned respectively invert this condition and provide inhibit pulses to their respective subsequent logic elements. The output signals from the Group Borrow Enables 44 are applied (see FIG. 10*b* and FIG. 10*c*) as follows: $\overline{E0}$ on wire 220 to NOR circuit B4306 labeled 234, $\overline{E1}$ on wire 222 to NOR circuit B4300 labeled 232, $\overline{E2}$ on wire 224 to NOR circuit B4318 labeled 238, $\overline{E3}$ on wire 226 to NOR circuit B4312 labeled 236, $\overline{E4}$ on wire 228 to NOR circuit B4330 labeled 240, and $\overline{E5}$ on wire 230 to NOR circuit B2301 labeled 242. In addition to the Group Borrow Enable 44 signals which are applied to the just mentioned NOR circuit, the Group Borrow signals 42 are also selectively applied. Therefore, the G0 signal is applied as an input on wire 196 to NOR circuit B4300, the G1 signal is applied on wire 198 to NOR circuit B4306, the G2 signal is applied on wire 200 to NOR circuit B4312, the G3 signal is applied on wire 202 to NOR circuit B4318, the G4 signal is applied on wire 204 to NOR circuit B2301, and the G5 signal is applied on wire 206 to NOR circuit B4330. In combination with the Group Borrow signals just enumerated, the Group Borrow Enable signals are applied to this level of logic also. This is done in a following manner: $\overline{E0}$ is applied on wire 220 as an input to NOR circuit B4306, $\overline{E1}$ is applied on wire 222 as an input to NOR circuit B4300, $\overline{E2}$ is applied on wire 224 as an input to NOR circuit B4318, $\overline{E3}$ is applied on wire 226 as an input to NOR circuit B4312, $\overline{E4}$ is applied on wire 228 as an input to NOR circuit B4330, and $\overline{E5}$ is applied on wire 230 as an input to NOR circuit B2301. The result of the logical combination by NOR circuit B4300 of the $\overline{E1}$ signal and the G0 signal is applied as an input on wire 246 to NOR circuit B5300 labeled 244. This input signal and the $\overline{G1}$ signal applied on wire 248 are combined logically by NOR circuit B5300 to provide the R0 Intrinsic output signal on wire 280. This signal provides the end-around borrow characteristics. The result of the logical combination of the G1 input signal and the $\overline{E0}$ input signal by NOR circuit B4306 is applied as an input on wire 252 to NOR circuit B5306 labeled 250. This signal and the $\overline{G0}$ signal applied on wire 254 are combined logically by NOR circuit B5306 to provide the R1 Intrinsic output signal on wire 282. The result of the logical combination of the G2 input signal and the $\overline{E3}$ signal by NOR circuit B4312 is applied as an input on wire 258 to NOR circuit B5312 labeled 256. This input signal and the $\overline{G3}$ signal on wire 260 are combined logically by NOR B5312 to provide the R2 Intrinsic output signal on wire 284. The R2 Intrinsic signal provides the second of the three end-around borrow control paths for the 12-bit operand selection. The result of the logical combination of the G3 input signal and $\overline{E2}$ signal by NOR circuit B4318 is applied on wire 264 as an input to NOR circuit B5318 labeled 262. The result of the logical combination of this input and the $\overline{G2}$ signal by NOR circuit B4318 is the R3 Intrinsic which applied on wire 286. The result of the logical combination of the G4 signal and the $\overline{E5}$ signal by NOR circuit B2301 is applied on wire 272 as an input to NOR circuit B5324 labeled 268. It should be noted that the logical result of the operation of NOR circuit B2301 is shared with the 0 stage of the P Intrinsic. The result of the logical combination of this input and the $\overline{G5}$ input by NOR circuit B5324 results in propagating the R4 Intrinsic signal on wire 288. The $R^4$ Intrinsic provides the third end-around borrow control path for the 12-bit operand selection. Finally, the result of the logical combination of the G5 signal and the $\overline{E4}$ signal by NOR circuit B4330 is applied as an input to NOR circuit B5330 labeled 274. This signal and the $\overline{G4}$ signal are logically combined by NOR circuit B5330 to provide the R5 Intrinsic output on wire 290. The foregoing description illustrates the control operation of the end-around borrow paths for the 12-bit operand selection, and describes the group-arrangement that must be satisfied when Group Borrow signals are generated. The following list of higher-level logic equations defines the Intrinsic operation for the 12-bit operand selection;

$R0=G1+G0\overline{E1}$ (end-around borrow)
$R1=G0+G1\overline{E0}$
$R2=G3+G2\overline{E3}$ (end-around borrow)
$R3=G2+G3\overline{E2}$
$R4=G5+G4\overline{E5}$ (end-around borrow)
$R5=G4+G5\overline{E4}$ Examination of the foregoing set of logic equations illustrates how the three independent operands are operated upon to propagate the necessary end-around borrows. It will be noted that no control term representing T7*a* is present in the above logic equation. This synchronizing selection must be present as an enable for the 12-bit operand selection, hence is in the nature of a constant input signal for all R Intrinsic stages. For one of the other modes of operation T7*a* would be expressed as an inhibit signal and there would be only "0" (enable) outputs on wires 280, 282, 284, 286, 288, and 290.

FIG. 10*d* illustrates the Q Intrinsic signals for one 18-bit operand. Since the R Intrinsic signals for the 12-bit operand were described for all three cases, it would be repetitive to describe the Q Intrinsic logic for both of the 18-bit operands. Therefore, only the one complete operand operation will be described.

Control pulse T7*b* is applied on wire **17*b* as an input to NOR circuits B5301 labeled 292, B5307 labeled 294, and B5313 labeled 296. The same enabling control signal is applied to the Q Intrinsic logic circuits for the second 18-bit operand as well, but is not shown in this illustration. As in the case of the R Intrinsics 50**, this control pulse provides the selection of the operand length in the enable state. In the event that an operand length other than 18-bits is desired, T7*b* provides an inhibit signal to the output stages of the Q Intrinsic logic, thereby providing "0" (enable) signals on wires 318, 320, and 322. NOR circuit B4301 labeled 298 receives the G1 input on wire 198 and the $\overline{E2}$ input on wire 224. The result of the logical combination of these inputs by NOR circuit B4301 is a signal on wire 308 which is applied as an input to NOR circuit B5301. Nor circuit B4302 labeled 300 receives the G0 input on wire 196, the $\overline{E1}$ input on line 222, and the $\overline{E2}$ input on line 224. The result of the logical combination of these signals by NOR circuit B4302 is a signal on wire 310 which is also applied as an input to NOR circuit B5301. In addition to the two inputs just described, NOR circuit B5301 receives the $\overline{G2}$ input on wire 266. The logical combination of these input signals by NOR circuit B5301 results in the output of Intrinsic Q0 on wire 318. NOR circuit B4307 labeled 302 receives the G2 input signal on wire 200 and the $\overline{E0}$ input on wire 220. The output of NOR circuit B4307 is applied on wire 312 as an input to NOR circuit B5307. NOR circuit B4308 labeled 304 receives the G1 input on wire 198, the $\overline{E0}$ input on wire 220, and the $\overline{E2}$ input on wire 224. The logical combination of these signals provides an output from NOR circuit B4308 on wire 314 which is applied as an input to NOR circuit B5307. In addition to the two inputs just described NOR circuit B5307 receives the $\overline{G0}$ input on wire 254. The logical combination of these input signals by NOR circuit B5307 results in the Q1 Intrinsic signal being supplied as an output on wire 320. NOR circuit B4314 labeled 306 receives the G2 input on wire 200, the $\overline{E0}$ input on wire 220, and the $\overline{E1}$ input on wire 222. The result of the logical combination of these input signals by NOR circuit B4314 provides an input on wire 316 to NOR circuit B5313. The $\overline{G1}$ signal input is applied to NOR circuit B5313 over wire 248. The output from NOR circuit B4300 is also applied as an input to NOR circuit B5313 over wire 246. It should be noted that the latter input is shared with the R0 Intrinsic. This provides a savings in hardware, and is due to the fact that a similar logical combination of the Group Borrow and Group Borrow Enable signals is required for that logical network. The result of the logical combination of these input signals by NOR circuit B5313 is an output on wire 322 which is the Q2 Intrinsic. The following logic equations clearly describe the operation of the propagation of the end-around borrow required for the 18-bit operand selection, and illustrate the interaction of the Group Borrow and Group Borrow Enable signals. Again, it will be noted that the control pulse T7*b* is omitted from the equations that represent this logic. The following logic equations define the propagation of the Q Intrinsics:

$Q0=G2+G1\ \overline{E2}+G0\ \overline{E2}\ \overline{E1}$ (end-around borrow)
$Q1=G0+G2\ \overline{E0}+G1\ \overline{E2}\ \overline{E0}$
$Q2=G1+G0\ \overline{E1}+G2\ \overline{E0}\ \overline{E1}$
$Q3=G5+G4\ \overline{E5}+G3\ \overline{E5}\ \overline{E4}$ (end-around borrow)
$Q4=G3+G5\ \overline{E3}+G4\ \overline{E5}\ \overline{E3}$
$Q5=G4+G3\ \overline{E4}+G5\ \overline{E4}\ \overline{E3}$ The generation of Q3, Q4, and Q5 Intrinsic signals is accomplished in a manner very similar to that illustrated in FIG. 10*d*, and use corresponding Group Borrow 42 and Group Borrow Enable 44 pulses.

FIG. 10*a* and FIG. 10*b* illustrate sample stages of the P Intrinsic 54. Only two stages are shown because the logic becomes repetitive and can be fully understood from the higher level logic equations which will be given at the end of the discussion. NOR circuit B2301 supplies an input on wire 272 to NOR circuit B3300 labeled 328. It will be noted that this output is shared with R4 of the R Intrinsics 50, due to the fact that the same logical combination of the G4 and $\overline{E5}$ signals is there required. NOR circuit B2302 labeled 324 receives the G3 input on wire 202, the $\overline{E4}$ input on wire 228, and the $\overline{E5}$ input on wire 230. The logical combination of these input signals made by NOR circuit B2302 is applied on wire 326 as an input to NOR circuit B3300. NOR circuit B2303 labeled 330 receives the G2 input on wire 200, the $\overline{E3}$ input on wire 226, the $\overline{E4}$ input on wire 228, and the $\overline{E5}$ input on wire 230. The result of the logical combination of these inputs by NOR circuit B2303 is applied over wire 332 as an input signal to NOR circuit B3300. NOR circuit B2304 labeled 334 receives the G1 input on wire 198, the $\overline{E2}$ input on wire 224, the $\overline{E3}$ input on wire 226, the $\overline{E4}$ input on wire 228, and the $\overline{E5}$ input on wire 230. The result of the logical combination of these inputs by NOR circuit B2304 is applied over wire 336 as an input signal to NOR circuit B3300. NOR circuit B2305 labeled 338 receives the G0 input on wire 196, the $\overline{E1}$ input on wire 222, the $\overline{E2}$ input on wire 224, the $\overline{E3}$ input on wire 226, the $\overline{E4}$ input on wire 228, and the $\overline{E5}$ input on wire 230. The result of the logical combination of these input signals by NOR circuit B2305 provides an input pulse over wire 340 to NOR circuit B3300. NOR circuit B3300 also receives the $\overline{G5}$ input over wire 270. It is this last input which provides for the end-around function for the 36-bit operand. The result of the logical combination of these input signals by NOR circuit B3300 supplies the P0 Intrinsic output signal on wire 342. NOR circuit B2307 labeled 344 receives the $\overline{E0}$ input on wire 220 and the G5 input on wire 206. The result of the combination of these two input signals by NOR circuit B2307 is propagated as an input pulse on wire 346 to NOR circuit B3306 labeled 348. NOR circuit B2308 labeled 350 receives the $\overline{E0}$ input on wire 220, the $\overline{E5}$ input on wire 230, and the G4 input on wire 204. The result of the logical combination of these input signals by NOR circuit B2308 is applied over wire 352 as an input to NOR circuit B3306. NOR circuit B2309 labeled 354 receives the G3 input over wire 202, the $\overline{E0}$ input on wire 220, the $\overline{E4}$ input on wire 228, and the $\overline{E5}$ input on wire 230. The result of the logical combination of these inputs by NOR circuit B2309 is applied over wire 356 as input to NOR circuit B3306. NOR circuit B2310 labeled 358 receives the G2 input over wire 200, the $\overline{E0}$ input over wire 220, the $\overline{E3}$ input over wire 226, the $\overline{E4}$ input over wire 228, and the $\overline{E5}$ input over wire 230. The result of the logical combination of these input signals by NOR circuit B2310 provides an input pulse on wire 360 which is applied to NOR circuit B3306. NOR circuit B2311 labeled 362 receives the G1 input on wire 198, the $\overline{E0}$ input on wire 220, the $\overline{E2}$ input on wire 224, the $\overline{E3}$ input on wire 226, the $\overline{E4}$ input on wire 228, and the $\overline{E5}$ input on wire 230. The result of the logical combination of these input signals by NOR circuit B2311 results in an input on wire 364 to NOR circuit B3306. In addition to the signals just described NOR circuit B3306 receives the $\overline{G0}$ input on wire 254. The result of the logical combination of the inputs to NOR circuit B3306 provides the P1 Intrinsic on wire 366 as an input to the Borrow Tree 84.

The P Intrinsics 54 are gated in a manner similar to the R Intrinsics 50 and the Q Intrinsics 52, by control pulse T7*c* which is applied on wire 17*c* as a synchronizing pulse to all of the output stages of the P Intrinsics 54. Again, this pulse is the enabling or disabling control which is made by the programmable selection of the operand length, hence when operand lengths other than 36-bits are desired, control pulse T7*c* will consist of an inhibit thereby providing only enable pulses from the outputs from the P Intrinsics 54 to the Borrow Tree 84. This effectively disables any P Intrinsic control of the end-around borrow.

It is believed that further detailed description of the P Intrinsic 54 stages would not clarify the operation, but that the set of logical equations defining the P Intrinsic operation would best serve the purpose of describing their complete operation. The following list of equations are a higher ordered set of logical combinations which completely define the operation of the P Intrinsic 54;

$$P0=G5+G4\,\overline{E5}+G3\,\overline{E4}\,\overline{E5}+G2\,\overline{E3}\,\overline{E4}\,\overline{E5}+G1\,\overline{E2}\,\overline{E3}\,\overline{E4}\,\overline{E5}+G0\,\overline{E1}\,\overline{E2}\,\overline{E3}\,\overline{E4}\,\overline{E5}\ \text{(end-around borrow)}$$

$$P1=G0+G5\,\overline{E0}+G4\,\overline{E0}\,\overline{E5}+G3\,\overline{E0}\,\overline{E5}\,\overline{E4}+G2\,\overline{E0}\,\overline{E5}\,\overline{E4}\,\overline{E3}+G1\,\overline{E0}\,\overline{E5}\,\overline{E4}\,\overline{E3}\,\overline{E2}$$

$$P2=G1+G0\,\overline{E1}+G5\,\overline{E0}\,\overline{E1}+G4\,\overline{E5}\,\overline{E0}\,\overline{E1}+G3\,\overline{E4}\,\overline{E5}\,\overline{E0}\,\overline{E1}+G2\,\overline{E3}\,\overline{E4}\,\overline{E5}\,\overline{E0}\,\overline{E1}$$

$$P3=G2+G1\,\overline{E2}+G0\,\overline{E1}\,\overline{E2}+G5\,\overline{E0}\,\overline{E1}\,\overline{E2}+G4\,\overline{E5}\,\overline{E0}\,\overline{E1}\,\overline{E2}+G3\,\overline{E4}\,\overline{E5}\,\overline{E0}\,\overline{E1}\,\overline{E2}$$

$$P4=G3+G2\,\overline{E3}+G1\,\overline{E2}\,\overline{E3}+G0\,\overline{E1}\,\overline{E2}\,\overline{E3}+G5\,\overline{E0}\,\overline{E1}\,\overline{E2}\,\overline{E3}+G4\,\overline{E5}\,\overline{E0}\,\overline{E1}\,\overline{E2}\,\overline{E3}$$

$$P5=G4+G3\,\overline{E4}+G2\,\overline{E3}\,\overline{E4}+G1\,\overline{E2}\,\overline{E3}\,\overline{E4}+G0\,\overline{E1}\,\overline{E2}\,\overline{E3}\,\overline{E4}+G5\,\overline{E0}\,\overline{E1}\,\overline{E2}\,\overline{E3}\,\overline{E4}$$

Again, it will be noted that the T7*c* term for the operand length selection is omitted from the logic equations which describe the operation of the P Intrinsic logic 54. This is due the synchronizing and selection nature of the term which makes it similar to a constant requirement.

FIG. 11 illustrates a function of the Bit-Borrow Tree 84 and the final Half-Subtract 90. The logical operation prior to the Bit-Borrow Tree 84 has generated the bit-differences, which are stored in the A1-Register 34, the requisite borrow-bits which are stored in the B1-Register 36, and has anticipated the requirement of borrow propagation outside of the six-bit groups with the corresponding end-around borrow requirements as it may be necessary. The latter function has been accomplished by the appropriate selection of the Intrinsic logic. Description will be made concerning the bit-borrow propagation within one six-bit group only, since the operational description in the remaining five groups would be repetitious. The extension of the logic equation to be shown for this group to the higher ordered stages of six digit positions will be obvious to one skilled in the art.

As described above, the non-selected Intrinsic logic will be gated in such a manner that their outputs will provide enables to the Bit-Borrow Tree 84, thereby allowing the selected operand length Intrinsic signals to control the operation in the Bit-Borrow Tree. NOR circuits B0400 labeled 370, D1400 labeled 372, B1402 labeled 374, B1403 labeled 376, B1404 labeled 378, and B1405 labeled 380 receives input signals from the R0 Intrinsic on wire 280, the Q0 Intrinsic on wire 318, and the P0 Intrinsic on wire 342. The function of the stages of the final Half-subtract 90 is to combine the bit-difference formed in the Inverted Half-Subtract 32 with the borrow-bits generated in the Bit-Borrow Tree 84. Consequently, it is desirable to represent the borrow-bit signals by a single reference designation. The reference designation chosen is the latter "W" followed by a numeral which represents the stage of the A0-Register 22 with which it is associated. NOR circuit B0400 provides the $\overline{W0}$ borrow-bit signal, NOR circuit B0401 labeled 382 provides the W1 borrow-bit signal, NOR circuit B0402 labeled 384 provides the W2 borrow-bit signal, NOR circuit B0403 labeled 386 provides the W3 borrow-bit signal, NOR circuit B0404 labeled 388 provides the W4 borrow-bit signal, and NOR circuit B0405 labeled 400 provides the W5 borrow-bit signal. The result of the logical combination of these input signals is the W2 signal which is applied on wire 416 to NOR circuit D0402 labeled 418. The signals comprising the inputs to NOR circuits B0402, and which thereby result in an output of the W2 signal, are also applied as inputs to NOR circuit D1402 labeled 420, and collectively may be considered to be the $\overline{W2}$ signal. In addition to the Intrinsic inputs, NOR circuit B1403 receives an input on wire 146 from the "0" side of FF A102. The "0" side output of FF A102 is also sent on wire 146 to NOR circuits B3403 labeled 426 and B2403 labeled 422. The "0" side output of FF A101 is applied over wire 144 as an input signal to NOR circuits B1403 and B2403. Additionally, NOR circuit B2403 receives an input on wire 178 from the "1" side of FF B100. NOR circuit B3403 receives its remaining input from the "1" side of FF B101 on wire 176. The result of the logical connectives made by NOR circuits B1403, B2403, and B3403, are applied as inputs to NOR circuit B0403 over wires 432, 434, and 436, respectively. These same inputs are applied over the same wires to NOR circuit D1403 labeled 438. In conjunction with the input signals just described NOR circuit B0403 and D1403 receive inputs from the "0" side of FF B102 over wire 440. These input signals to D1403 collectively represent the $\overline{W3}$ signal, while the logical connective function performed by NOR circuit B0403 results in the output of the W3 signal on wire 442. W3 is supplied as an input to NOR circuit D0403 labeled 444. NOR circuit B1404 receives inputs from the "0" side of FF A103 over wire 148, the "0" side of FF A102 on wire 146, the "0" side of FF A101 on wire 144, and the "0" side of FF A100 on wire 142 in addition to the inputs received from the Intrinsic logic. NOR circuit B2404 labeled 448 receives inputs from the "0" side of flip-flops A103, A102, A101 over wires 148, 146, and 144, respectively. Additionally, NOR circuit B2404 receives an input from the "1" side of FF B100 on wire 178. NOR circuit B3404 labeled 450 receives an input from the "1" side of FF B101 on wire 176, in addition to inputs from the "0" side of flip-flops A103 on wire 148 and A102 on wire 146. NOR circuit B4404 labeled 452 receives an input of the "0" side of FF A103 on wire 148 and an input from the "1" side of FF B102 on wire 174. The result of the logical connective functions performed by NOR circuits B1404, B2404, B3404, and B4404, are applied as inputs to NOR circuit B0404 labeled 388 over wires 456, 458, 460 and 462, respectively. The same group of signals is applied over the same wires as inputs to NOR circuits D1404 labeled 464. The "0" side output of FF B103 is applied on wire 466 as an input to NOR circuits B0404 and D1404. The result of the logical combination by NOR circuit B0404 of the input signals applied is the propagation of the W4 pulse on wire 468 as an input to NOR circuit D0404 labeled 470. NOR circuit B1405 receives inputs from the "0" side of flip-flops A104 on wire 150, A103 on wire 148, A102 on wire 146, A101 on wire 144, and A100 on wire 142 in addition to the Intrinsic signals which have been previously described. NOR circuit B2405 labeled 474 receives inputs from the "0" side of flip-flops A104 on wire 150, A103 on wire 148, A102 on wire 146, A101 on wire 144, and from the "1" side of FF B100 on wire 178. NOR circuit B3405 labeled 476 receives inputs from the "0" sides of flip-flops A104 on wire 150, A103 on wire 148, A102 on wire 146 and from the "1" side of FF B101 on wire 176. NOR circuit B4405 labeled 478 receives inputs from the "0" side of flip-flops A104 on wire 150, A103 on wire 148 and from the "1" side of FF B102 on wire 174. NOR circuit B5405 labeled 480 receives inputs from the "0" side of FF A104 on wire 150, and from the "1" side of FF B103 on wire 172. The result of the logical combination of the input signals to the respective NOR circuits B1405, B2405, B3405, B4405, and B5405 are transmitted as inputs to NOR circuit B0405 labeled 400 on wires 484, 486, 488, 490, and 492, respectively. These same signals are applied over the same wires as inputs to NOR circuit D1405 labeled 496 in addition to an input from the "0" side of FF B104 on wire 494. The logical combination of these input signals represent signal $\overline{W5}$. NOR circuit B0405 also receives an input from the "0" side of FF B104 on wire 494. The result of the logical combination of the inputs to NOR circuits B0405 is the propagation of the W5 signal on wire 500 as an input to NOR circuit D0405 labeled 502.

For this set of six Borrow-Bits the following logic equations represent the requisite input signals which must be supplied to fully account for the propagation of each borrow-bit:

$$\overline{W0}=R0\,Q0\,P0$$

$$W1=\overline{B100}+\overline{A100}\,R0\,Q0\,P0$$

$$W2=\overline{B101}+\overline{A101}\,B100+\overline{A101}\,\overline{A100}\,R0\,Q0\,P0$$

$$W3=\overline{B102}+\overline{A102}\,B101+\overline{A102}\,\overline{A101}\,B100+\overline{A102}\,\overline{A101}\,\overline{A100}\,R0\,Q0\,P0$$

$$W4=\overline{B103}+\overline{A103}\,B102+\overline{A103}\,\overline{A102}\,B101+\overline{A103}\,\overline{A102}\,\overline{A101}\,B100+\overline{A103}\,\overline{A102}\,\overline{A101}\,\overline{A100}\,R0\,Q0\,P0$$

$$W5=\overline{B104}+\overline{A104}\,B103+\overline{A104}\,\overline{A103}\,B102+\overline{A104}\,\overline{A103}\,\overline{A102}\,\overline{B101}+\overline{A104}\,\overline{A103}\,\overline{A102}\,\overline{A101}\,B100+\overline{A104}\,\overline{B103}\,\overline{A102}\,\overline{A101}\,\overline{A100}\,R0\,Q0\,P0$$

Similar equations can be readily generated for the remaining borrow-bit stages of the Bit-Borrow Tree 84, and further detailed description would not clarify the inventive operation of this device.

It remains, then, to combine the results of the initial Inverted Half-Subtract 32 with the completely propagated borrow-bits which have just been determined by the final action of the Bit-Borrow Tree 84. This is done in the corresponding stages of the final Half-Subtract 90 logic network. This logical combination of signals is done by way of an Exclusive-OR function of each of the corresponding stages of the Borrow signal generated and the data signal retained in the A1-Register 34. Considering any stage "*i*," the following logic equation will determine the state of that particular stage:

$$Di=\overline{Ai}\,Wi+Ai\,\overline{Wi}$$

The following truth table will illustrate the bit that will finally reside in the A0 register 22 as a result of the final Half-Subtract 90.

| Ai | Wi | Bit-difference D |
|---|---|---|
| 0 | 0 | 0 |
| 0 | 1 | 1 |
| 1 | 0 | 1 |
| 1 | 1 | 0 |

At a time prior to the final Half-Subtract 90, Control pulse T8 is applied on wire 18 to the "1" side of each stage of the flip-flops comprising the A0-Register 22, and results in setting each stage to store a "1" signal. This is required so that the inherent mode of the operation of the NOR circuit logic will not require an additional stage of inversion between a final Half-Subtract 90 and its application as an input to the A0-Register 22. By presetting the A0-Register 22 to the "1" state, it becomes possible to apply a Clear pulse from the output of the final Half-Subtract 90 to the corresponding flip-flop in the A0-Register 22 rather than having to invert the output signal and apply it to the Set side. This means that where a stage of the resultant operand should consist of a "1" signal, the output from the corresponding stage of the final Half-Subtract 90 would provide a "0" pulse to the Clear side of the corresponding stage of the A0-Register 22, hence having it in the Set ("1") condition. On the other hand, should a "0" be in the stage of the resulting operand to be stored in A0-Register 22, the output from a corresponding stage of the final Half-Subtract 90 would be a "1" signal, which would be applied to the Clear side of the flip-flop in the A0-Register 22. The result of the application of such a signal clears that stage to the "0" condition.

In addition to the $\overline{W0}$ input NOR circuit D0400 receives an input from the "1" side of FF A100 on wire 504. A logical combination of these two signals is applied over wire 506 as one of the inputs to NOR circuit A0200 labeled 508, and supplies half of the logical input required to satisfy the final Half-Subtract equation expressed above. In addition to the combination of signals representing W0 NOR circuit D1400 receives an input from the "0" side of FF A100 on wire 142. As described previously, the logical function of NOR circuit D1400 is shared with the next succeeding stage as a borrow pulse as well as being applied over wire 375 as an input to NOR circuit A0200 thereby supplying the other half of the input requisite to satisfaction of the Half-Subtract equation. The logical combination is then applied on wire 510 as an input signal to the "0" (Clear) side of FF A000, and thereby puts the "00" stage in the resultant condition. NOR circuit D0401 receives an input from the "0" side of FF A101 on wire 144 thereby supplying an input on wire 512 to NOR circuit A0201 labeled 514. NOR circuit D1401 receives an input from the "1" side of FF A101 on wire 516 in addition to the $\overline{W1}$ signal combination, and thereby produces an output on wire 518 which is applied as an input to NOR circuit A0201. As a result of the logical combination of these two signals by A0201, an output is provided on wire 520 which is supplied to the "0" (Clear) side of FF A001, and thereby appropriately puts the "01" stage of the A0-Register 22 in the resultant condition. NOR circuit D0402 receives an input from the "0" side of FF A102 in addition to the W2 input, thereby supplying one of the inputs on wire 522 to NOR circuit A0202 labeled 524. NOR circuit D1402 receives an input from the "1" side of FF A102 on wire 526 in addition to the $\overline{W2}$ combination of signals. The result of this logical combination is also applied to NOR circuit A0202 as an input signal on wire 528. These two logical input signals are appropriately combined by NOR circuit A0202 and applied on wire 530 as an input to the "0" (Clear) side of FF A002. This signal puts the "02" stage of the A0-Register 22 in the resultant condition. NOR circuit D0403 receives an input from the "0" side of FF A103 on wire 148 in addition to the W3 input which is applied on wire 442. The logical combination of these two input signals by NOR circuit D0403 is applied on wire 532 as an input to NOR circuit A0203 labeled 534. In addition to the $\overline{W3}$ combination of input pulses, NOR circuit D1403 receives an input from the "1" side of FF A103 on wire 144. The logical combination of these input pulses by NOR circuit D1403 is applied over wire 538 as an input to NOR circuit A0203. The result of the logical combination by NOR circuit A0203 of these signals is applied on wire 540 as an input to the "0" (Clear) side of FF A003 of the A0-Register 22 which puts the "03" stage in the resultant condition. NOR circuit D0404 receives an input from the "0" side of FF A104 on wire 150 in addition to the W4 input received on wire 468. The result of the logical combination of these input signals is applied on wire 542 as an input to NOR circuit A0204 labeled 544. In addition to the combination of signals representing $\overline{W4}$, NOR circuit D1404 receives an input from the "1" side of FF A104 on wire 546. The logical combination of these input signals by NOR circuit D1404 is applied on wire 548 as the other input to NOR circuit A0204, and the logical combination resulting therefrom is applied on wire 550 as an input to the "0" (Clear) side of FF A004 of the A0-Register 22. NOR circuit D0405 receives an input from the "0" side of FF A105 on wire 152 in addition to the W5 input received on wire 500. The logical combination of these two inputs by NOR circuit D0405 is applied as an input on wire 552 to NOR circuit A0205 labeled 554. In addition to the signals collectively representing $\overline{W5}$, NOR circuit D1405 receives an input from the "1" side of FF A105 on wire 556. The result of a logical combination of these signals by NOR circuit D1405 is applied on wire 558 as an input to NOR circuit A0205. The two inputs to NOR circuit A0205 satisfy the required terms of the Half-Subtract equation listed above, and results in an output on wire 560, which is applied as an input to the "0" (Clear) side of FF A005 in the A0-Register 22.

The $\phi 2$ 94 of the Master Clock and Control 10 pulse enable T9 are applied to all stages of the final Half-Subtract 90 which supplies the inputs of the A0-Register 22. For proper operation the results from the arithmetic operation, a phase two pulse, and the T9 enable pulse must occur sufficiently simultaneously to meet the timing requirements of the basic NOR circuit and thereby gate the resultant stage values into the A0-Register 22.

The remaining five groups of six stages each are comprised of similar Bit-Borrow Tree 84 logic circuitry, and final Half-Subtract 90 logic circuitry as was just described in detail. Further detailed description would not tend to clarify the operation of this device, but instead would tend to be repetitious.

It is understood that suitable modification may be made in the structure as disclosed provided such modifications come within the spirit and scope of the appended claims. Having now, therefore, fully illustrated and described our invention, what we claim to be new and desire to protect by Letters Patent is:

What is claimed is:

1. A parallel arithmetic system capable of selectively performing the addition or subtraction of multiple independent numbers comprising:

a signal receiving means responsive to two groups of parallel signals arranged in digit position order;

arithmetic-operation control means to selectively determine the arithmetic combination of said groups of parallel signals, such combination to be either additive or subtractive;

first arithmetic means coupled to said selective arithmetic-operation control means for combining the two signal groups in a manner to provide two intermediate resultant signal groupings, one intermediate grouping of resultant signals indicating the partial-resultant signals for respective digit positions in the group, and another intermediate group of resultant signals indicating inter-digit borrow conditions;

group-borrow signals generating and propagating means responsive to the intermediate resultant signal groupings for selectively propagating the borrow signals past grouped digit positions of the partial-resultant signals, said group borrow signal and propagating means comprising a plurality of enabling means connected to receive predetermined groups of a number of adjacent digit position signals of said partial-resultant, the outputs of said enabling means providing signals indicative of the presence of predetermined signals within said groups which could satisfy a borrow requirement propagated from a lower order group of partial-resultant signals, and a plurality of gate means connected to receive a number of adjacent digit position signals of said partial-resultant and said inter-digit borrow signals in predetermined groupings, the outputs of said grouped gating means coupled to said group-borrow signal propagating means, said group-borrow signal propagating means providing output signals representing the group-borrow signals, such propagation being from lower-ordered groups of said inter-digit borrow signal grouping to higher-ordered groups of the partial-resultant signal grouping;

digit-borrow control means coupled to the group-borrow signal generating and propagating means to selectively control the propagation of borrows from selected highest-ordered digit positions of the inter-digit borrow signal grouping to selected lowest-ordered digit positions of the partial-resultant signal grouping;

second arithmetic means responsively coupled to said digit-borrow control means and coupled to said partial-resultant signal grouping to provide the final resultant signal grouping, whereby the effective completed addition consists of signals representing a sum of one or more sets of independent operands.

2. A parallel arithmetic system comprising:

a first means for receiving two groups of parallel signals representing digit values arranged in digit position order;

second means coupled to the first means for combining two signal groups to provide intermediate resultant signal groupings, one group of intermediate resultant signals indicating the partial-resultants for respective digit positions in the groups, and another group of resultant signals indicating inter-digit borrow conditions;

group-borrow signal generating and propagating means responsive to the resultant signal groupings for selectively enabling and propagating the borrow signals past various digit positions of the partial-resultant signals to complete an effective addition;

operand-length selection control means coupled to said group-borrow signal generating and propagating means to selectively determine a plurality of intrinsic signal outputs to provide the end-around borrow signal paths;

digit-borrow signal propagating means coupled to said operand-length selection control means and responsive to the resultant inter-digit borrow grouping of signals to determine the final digit borrow and end-around borrow conditions;

arithmetic means responsively coupled to said digit-borrow signal propagating means and to said partial-resultant signal grouping to provide the final resultant signal grouping where said final resultant signal grouping represents the sum or difference of one or more sets of independent operands.

3. A parallel arithmetic system as in claim 2 wherein operand-length selection control means comprises:

segment-size signal means;

a plurality of logic circuits responsive to predetermined combinations of said group-borrow signal generating and propagating means and to said segment-size signals to provide resultant intrinsic signals such that appropriate end-around borrow signal paths are enabled, said end-around borrow signal paths providing paths for end-around borrow signals to be propagated from selected higher ordered digit positions of said inter-digit borrow signal groupings to selected lower ordered digit positions of said partial-resultant signal groupings.

4. Apparatus as in claim 2 wherein digit-borrow propagating means comprises:

a plurality of digit-borrow signal propagation circuits responsive to said intrinsic signals and to said group of interdigit borrow signals to provide the final borrow signal pattern such that when logically combined with said partial-resultant signal grouping will provide the resultant number or numbers.

5. Apparatus as in claim 2 wherein arithmetic means comprise:

a plurality of Exclusive-OR circuit combinations responsive to corresponding stages of said partial-resultant signal grouping, and to final borrow and end-around borrow patterns such that signals resulting from said Exclusive-OR logical combinations represent the final operand or multiple independent operands.

6. In a parallel binary adder:

first and second operand storage registers made up of a multiplicity of parallel static flip-flop circuits, each flip-flop capable of selectively storing a signal representing a digit value of "0" when cleared and a value of "1" when set, said first operand storage register selectively providing an output signal grouping indicative of a single augend or of parallel independent multiple augends, said second operand storage register selectively providing an output signal grouping indicative of a single addend or of parallel multiple independent addends;

a plurality of first arithmetic circuits responsive to signals received from respective stages of said first and second operand storage registers, where said arithmetic circuits perform a bit-by-bit inverted Exclusive-OR logical function, thereby providing two groupings of resultant signals, the first resultant grouping being a partial-resultant representing the inverted bit-differences of the respective stages of the two operand storage registers and the second resultant grouping of signals indicates the bit-by-bit condition where inter-digit borrow signals are generated;

a first auxiliary register coupled to said plurality of first arithmetic circuits, for storing the inverted bit-difference signals in ordered groups of adjacent ordered digit positions;

a second auxiliary register coupled to said plurality of first arithmetic circuits for storing the inter-digit borrow signals in ordered groups of adjacent ordered digit positions;

a plurality of group-borrow enabling circuits responsive to signals from predetermined groups of adjacent digit positions of said first auxiliary register, the enabling circuits providing output signals indicative of the presence of signals held within said groupings of adjacent digit positions, which could satisfy borrow signals propagated from lower-ordered groupings of adjacent digit positions of said second auxiliary register;

a plurality of group-borrow signal propagating circuits responsive to signals from said predetermined signal groupings of adjacent digit positions of said first auxiliary register and responsive to signals from corresponding groups of said predetermined signal groupings of adjacent digit positions of said second auxiliary register, whereby group-borrow signals are propagated from groups wherein the highest ordered inter-digit borrow cannot be satisfied within the predetermined signal grouping of adjacent digit positions of said first auxiliary register, such group-borrow signal propagation being from lower-ordered groups of inter-digit borrow signals to higher-ordered groups of inverted bit-difference signals;

segment-size signal means;

a plurality of segment-size selection circuits responsive to said group-borrow enabling signals and to said group-borrow signals in conjunction with said segment-size signals to provide intrinsic signals such that the appropriate end-around borrow signal paths are selected;

a plurality of digit-borrow signal propagation circuits responsive to said intrinsic signals and to said inter-digit borrow signals stored in said second auxiliary register to provide the final borrow signal pattern such that when combined with the inverted bit-difference signals stored in said first auxiliary register will provide the resultant number or numbers;

control signal generating circuitry to provide input signals to said first multiple operand storage register such that each stage of said first operand storage register is set to store a "1" signal;

a plurality of second arithmetic circuits which perform an Exclusive-OR logical connective function on corresponding stages of said inverted bit-difference signals and said borrow signal pattern produced by said digit-borrow propagation circuits to provide a final grouping of output signals representing the complement of the desired resultant operand;

gate control circuitry coupled to the output stages of said plurality of second arithmetic circuits to provide synchronization of the application of the signal grouping representing the complement of the desired operand as signals to switch corresponding stages of said first multiple operand storage register to store a "0" signal where a "1" signal is provided as an input from one of said second arithmetic circuits, and leave unaltered the preset "1" signal in corresponding stages of said first multiple operand storage register where a "0" signal is applied from one of said second arithmetic circuits, thereby storing the resultant operand in said first operand storage register at the end of the arithmetic operation.

7. A high-speed parallel digital arithmetic system having first and second operand receiving and storage means coupled to means for simultaneously providing the difference signals and inter-digit borrow signal pattern of corresponding ordered digit positions of the operand storage means, said arithmetic system having a borrow-tree for the generation of borrow signals, the improvement being means to selectively determine the effective operand lengths comprising:

group-borrow signal propagation and enabling means responsively coupled to predetermined groups of adjacent ordered digit positions of the difference signals and the inter-digit borrow signal patterns, the propagated group-borrow signals providing anticipatory indication of the necessity to propagate borrow signals to higher ordered groups of said predetermined groups of adjacent ordered digit positions, and the enabled group-borrow signals providing anticipatory indication of the ability of said higher order groups of the difference signals to satisfy group-borrow signals propagated from lower ordered groups;

intrinsic signal generating means responsively coupled to said group-borrow signal propagation and enabling means to selectively provide the effective end-around borrow signals required, thereby selectively determining the operand length;

final borrow-signal pattern generating means to propagate borrow signals within said predetermined groups such that combination with corresponding stages of the difference signals will provide the resultant operand or resultant multiple operands.

8. A one's complement subtractive parallel arithmetic system having operand receiving means, said operands being signal groupings representing digit values arranged in digit position order, first partial-arithmetic means to simultaneously provide the bit-difference signals and the inter-digit borrow signal pattern of corresponding digit positions of the operands, second partial-arithmetic means to provide the resultant signal pattern, and having multiple selective end-around borrow means intermediate said first and second partial-arithmetic means, said multiple selective end-around borrow means comprising:

selective operand-length signal means for providing control signals indicative of the number of digit positions in each operand and the number of independent operands to be handled simultaneously by the arithmetic system;

a plurality of intrinsic means for providing different end-around borrow signals;

a plurality of operand-size selection means responsively coupled to said selective operand-length signal means and to said intrinsic means for selectively activating said provided end-around borrow signals by selectively enabling one set of a plurality of sets of end-around borrow signal paths, while selectively disabling the plurality of undesired sets of end-around borrow signal paths, in response to said operands size and number control signals, thereby effectively treating selected digit signal groupings in the operand words as independent numbers by selecting the effective radix points for selected operands.

9. Apparatus as in claim 8 having predetermined ordered groups of adjacent ordered digit positions of said bit-difference signal grouping and said inter-digit borrow signal pattern, and in addition thereto group-borrow signal propagating and enabling means comprising:

a plurality of propagating circuits responsively coupled to predetermined ordered groups of adjacent ordered digit positions of said bit-difference signal grouping and said inter-digit borrow signal pattern, said plurality of propagating circuits sampling groups of said bit-difference signal groupings for the presence of signals able to satisfy the highest-order inter-digit borrow signal propagated within corresponding groups of said inter-digit borrow signal pattern to provide resultant group-borrow signals when said highest-ordered inter-digit borrow cannot be satisfied within the corresponding group thereby requiring propagation of a borrow-signal to a higher-ordered group, or end-around to the selected radix group, said group-borrow signal propagation leaving intra-group borrows unsatisfied.

a plurality of enabling circuits responsively coupled to predetermined ordered groups of adjacent ordered digit positions of said bit-difference signal grouping to sample groups of said bit-difference signals to anticipate the presence of signals able to satisfy borrow signals propagated from lower-ordered predetermined ordered groups of adjacent ordered digit positions of said inter-digit borrow signal pattern, said enabling circuits to provide output signals to allow groups unable to satisfy propagated group-borrow signals to respectively be bypassed, with said propagated group-borrow pulses being further propagated to higher-ordered groups or as end-around borrow signals to lowest-ordered groups.

10. A parallel binary one's complement arithmetic system capable of selectively performing addition or subtraction of multiple independent operands comprising:

first and second operand receiving means;

arithmetic operation selection means;

first arithmetic means responsively coupled to said operand receiving means to provide intermediate resultant signal groupings, one grouping of intermediate resultant signals indicating the bit-by-bit inverted Exclusive-OR of the respective digit positions, and another intermediate resultant signal grouping indicating the borrow signal requirements of the respective digit positions;

group-borrow propagating and enabling means responsively coupled to said resultant signal groupings for selectively propagating borrow signals past digit groups of said one group of intermediate resultant signal groupings;

operand-size signal means;

intrinsic control means responsively coupled to said operand-size means and to said group-borrow propagating and enabling means for selectively determining operand-size and effective end-around borrow signal paths;

borrow signal propagating means for determining the final borrow-signal pattern of all digit positions simultaneously; and second arithmetic means responsive to said borrow signal propagating means and to said one grouping of intermediate resultant signals to provide a final resultant signal grouping indicative of the independent sum or independent difference of one or more sets of independent operands.

11. A parallel binary one's complement arithmetic system capable of selectively performing addition or subtraction of multiple independent operands having first and second arithmetic means, each of which are dissimilar in logical operation, and in combination determine the final resultant operands, the improvement being said first arithmetic means and interconnection means with said second arithmetic means comprising:

first and second operand receiving and storage register, and first and second auxiliary arithmetic registers made up of a multiplicity of bistable flip-flop circuits, each flip-flop capable of selectively storing a signal representing a digit value "0" when cleared and a "1" when set, said flip-flops having first output signal lines carrying the set values, and second output signal lines carrying the complement values;

means to clear all stages of said first and second auxiliary arithmetic registers;

arithmetic-operation selection means;

a plurality of first arithmetic circuits responsive to corresponding stages of said first and second operand receiving and storage registers, said plurality of arithmetic circuits to simultaneously provide the bit-by-bit inverted Exclusive-OR logical function of corresponding stages of the received operands, thereby to provide two groupings of resultant signals, the first resultant signal grouping being the inverted bit-difference signals, and the second resultant signal grouping being the inter-digit borrow signals;

coupling means from said plurality of arithmetic means to set corresponding stages of said first auxiliary arithmetic register with said inverted bit-difference signals;

coupling means from said plurality of arithmetic means to set corresponding stages of said second auxiliary arithmetic register with said inter-digit borrow signals;

operand-size signal means;

borrow signal propagation means responsively coupled to said first and second auxiliary arithmetic registers to provide the final borrow signal pattern;

coupling means from said borrow signal propagation means and from said first auxiliary arithmetic register to provide signals to said second arithmetic means, said second arithmetic means to provide the final signal grouping indicative of the independent sum or independent difference of one or more sets of independent operands.

12. A one's complement subtractive parallel arithmetic system having operand receiving means, said operand being signal groupings representing digit values arranged in digit position order, first partial-arithmetic means to simultaneously provide the bit-difference signals and the inter-digit borrow pattern of corresponding digit positions of the operands, second partial-arithmetic means to provide the resultant signal pattern, and having multiple selective end-around borrow means intermediate said first and second partial-arithmetic means, said multiple selective end-around borrow means comprising:

selective operand-length signal means for providing control signals indicative of the number of digit positions in each operand and the number of independent operands to be handled simultaneously by the arithmetic unit;

a plurality of intrinsic means for providing different end-around borrow signals;

a plurality of operand-size selection means responsively coupled to said selective operand-length signal means and to said intrinsic means for selectively activating said provided end-around borrow signals by selectively enabling one set of a plurality of sets of end-around borrow signal paths, while selectively disabling the plurality of undesired sets of end-around borrow signal paths in response to said operand size and number control signals, thereby effectively treating selected digit signal groupings in the operand words as independent numbers by selecting the effective radix points for selected operands; and final digit-borrow signal pattern propagation means including a plurality of borrow-propagation circuits responsively coupled to said intrinsic means, to said bit-difference signals, and to corresponding predetermined groups of said inter-digit borrow signal patterns, said borrow-propagation circuits sampling corresponding predetermined groups of bit-difference signals for the presence of signals capable of satisfying the inter-digit borrow condition, and providing output signals such that resulting borrow-signals are determined simultaneously and propagated to reside in appropriate digit positions, this propagation being in anticipation of being combined with the bit-difference signals to form the final resultant signal grouping.

References Cited by the Examiner

UNITED STATES PATENTS

| | | | |
|---|---|---|---|
| 2,904,252 | 9/1959 | Bird | 235—176 |
| 2,913,593 | 11/1959 | Kaufman | 235—176 X |
| 2,936,116 | 5/1960 | Adamson et al. | 235—176 X |
| 2,954,178 | 9/1960 | Maddox | 235—175 |
| 2,988,277 | 6/1961 | Yamada | 235—175 |

OTHER REFERENCES

Pages 67–71, January–March 1961, July 25, 1960, MacSorley "High-Speed Arithmetic in Binary Computers," received by the IRE, "Proceedings of the IRE," vol. 49.

ROBERT C. BAILEY, *Primary Examiner.*

MALCOLM A. MORRISON, *Examiner.*